US006194695B1

(12) United States Patent
Barrows

(10) Patent No.: US 6,194,695 B1
(45) Date of Patent: *Feb. 27, 2001

(54) PHOTORECEPTOR ARRAY FOR LINEAR OPTICAL FLOW MEASUREMENT

(75) Inventor: Geoffrey L. Barrows, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,621

(22) Filed: Aug. 27, 1998

(51) Int. Cl.⁷ .................................................. H01L 27/00
(52) U.S. Cl. ......................... 250/208.1; 356/28; 382/278
(58) Field of Search .............................. 250/208.1, 208.2, 250/229, 559.32; 356/28, 373; 702/142; 382/278

(56) References Cited

U.S. PATENT DOCUMENTS

| 4,616,931 | * | 10/1986 | Studer .................................. 356/373 |
| 4,623,778 | | 11/1986 | Cullen et al. ...................... 219/124.34 |
| 5,086,219 | | 2/1992 | Koch et al. ......................... 250/208.2 |
| 5,248,873 | | 9/1993 | Allen et al. ........................ 250/208.1 |
| 5,587,927 | * | 12/1996 | Nagao et al. ......................... 702/167 |
| 5,717,792 | * | 2/1998 | Poggio et al. ...................... 382/278 |
| 6,020,953 | * | 2/2000 | Barrows ................................. 356/28 |

* cited by examiner

Primary Examiner—Que T. Le
Assistant Examiner—Thanh X. Luu
(74) Attorney, Agent, or Firm—John J. Karasek; Sally A. Ferrett

(57) ABSTRACT

This invention is a one-dimensional optic flow sensor that operates in a small region of the two-dimensional visual field. The heart of the sensor is an linear array of photoreceptors that generates a one-dimensional image representation of the visual field region of interest. The linear photoreceptor array has an orientation in the two-dimensional image space. Information in the two-dimensional image space parallel to the photoreceptor array's orientation is preserved while information in other directions is discarded. The result is that a one-dimensional optic flow algorithm using the photoreceptor array output produces a measurement of the optic flow vector onto the sensor orientation vector. In a preferred embodiment, the photoreceptor array circuitry is implemented on a focal plane chip on which an image is focused by a lens. The focal plane chip is placed slightly off the lens's focal point to blur the image. Each elongated photoreceptor has a long rectangular shaped active area, whose long dimension is perpendicular to the photoreceptor array's orientation. An iris next to the lens controls the "shape" of the blurring by having a transmission function derived from a low-pass spatial filter. The combination of the lens being out of focus and the shading from the iris blur the image in a controlled fashion that implements a low pass spatial filter. This reduces high spatial frequency components in the image that could cause problems due to spatial aliasing from the photoreceptor array.

15 Claims, 18 Drawing Sheets

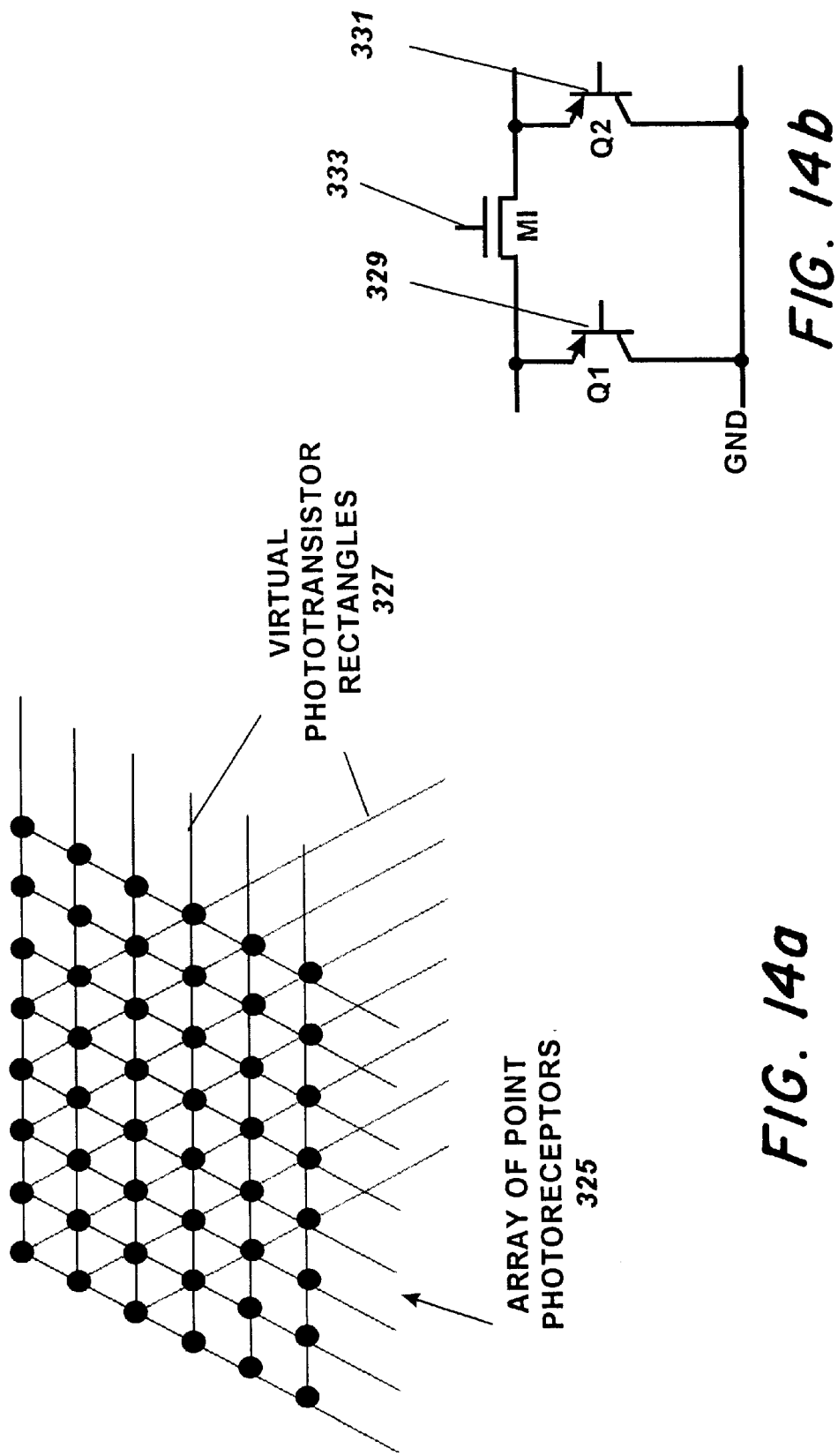

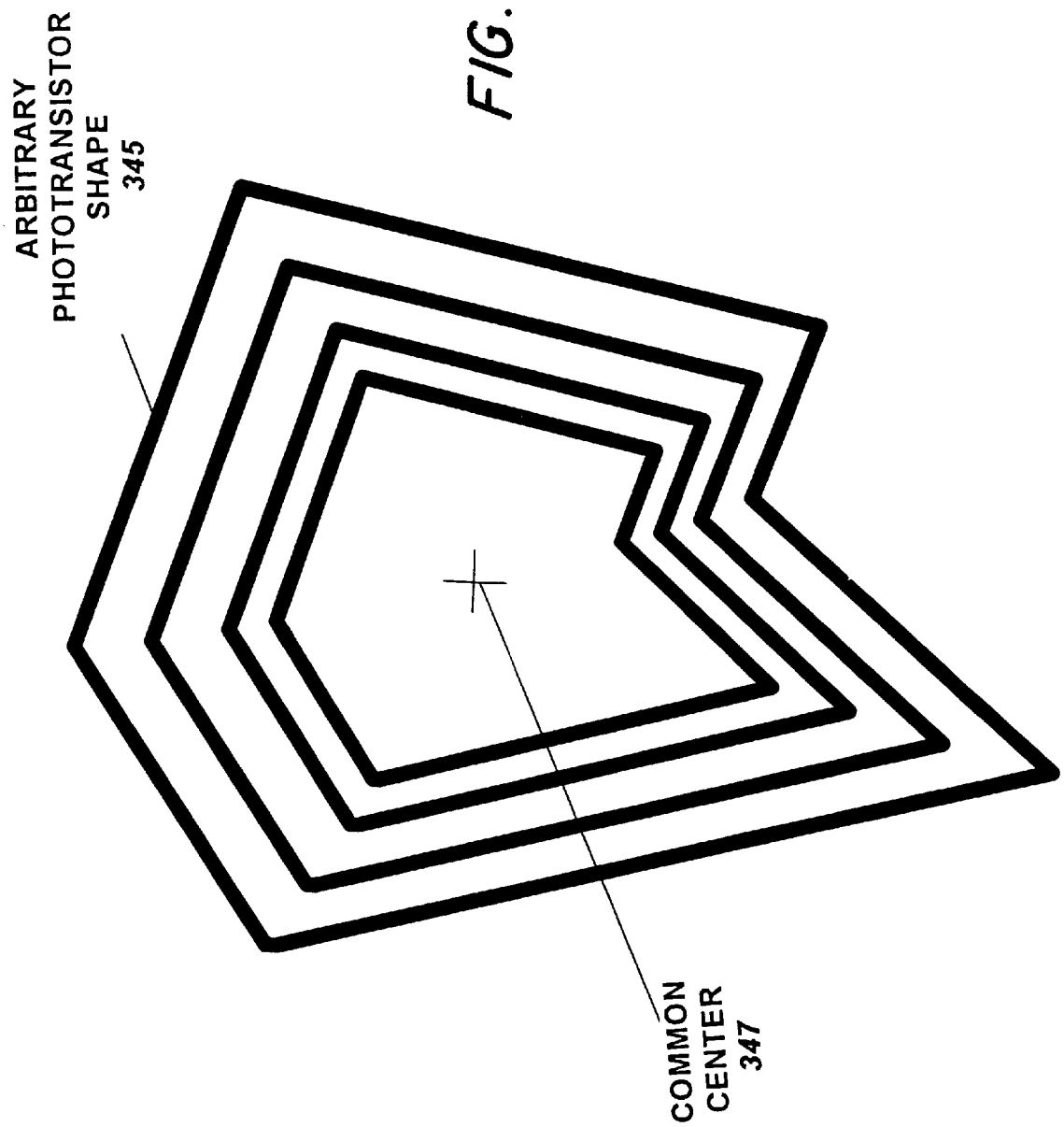

PHOTORECEPTOR ARRAY FOR LINEAR OPTICAL FLOW MEASUREMENT

CROSS-REFERENCE TO RELATED APPLICATION

This patent application is related to the co-pending U.S. patent application entitled "A Feature Tracking Linear Optic Flow Sensor". Serial No. (Navy Case No. 78,682), filed Aug. 27, 1998, both of which applications being commonly assigned to the Government of the U.S.

BACKGROUND OF THE INVENTION

1. Field of the Invention

This invention relates to the general field of optical flow computation in images, and more specifically, to the field of visual motion sensing chips.

2. Description of the Related Art

The term "optical flow" generally refers to the motion of texture seen by an agent (such as an animal or a robot) as a result of relative motion between the agent and other objects in the environment. It is well known that animals, especially insects, use information from the optical flow for depth perception and to move about in an environment without colliding into obstacles. Robotics and machine vision researchers have borrowed from these ideas in biology to build machine vision systems that successfully use optical flow for depth perception and obstacle avoidance. These successes verify that optical flow can indeed be used for depth perception and obstacles avoidance in real systems.

In robotics and machine vision, optical flow is mathematically expressed as a vector field either in the two-dimensional visual field 105 or in an image focal plane created by a lens. In the subsequent discussion, no differentiation is made between these two variations.

The value of the optic flow vector 103 (FIG. 1) at a location in the visual field 105 (FIG. 1) refers to the velocity at which texture 107 (FIG. 1) is moving in that location of the visual field 105. To measure optical flow, typical machine vision systems grab sets of two-dimensional pixel array images using a camera, and use these sequential images to measure the optical flow field. In general, algorithms for computing optical flow from a set of images are computationally intensive, resulting in the need for a large amount of computing power for the computation of optical flow. This is because optical flow is a phenomena that has both spatial and temporal aspects, hence a large amount of data (two-dimensions of image and one dimension of time) needs to be processed. This is especially true if the image is sensed with a charge coupled device (CCD) or another pixel-structured type of image sensor. Almost all modern machine vision systems use such pixel-structured cameras. A discussion of the variety of algorithms used to measure optical flow is beyond the scope of this invention. However two of the more successful and popular approaches, the correlation method and the gradient method, are applicable to this sensor.

The correlation method of measuring optic flow will be qualitatively discussed by now referring to FIGS. 2a through 2c. FIGS. 2a and 2b show two successive frames or images of a video sequence. FIG. 2a shows the first frame 115, a location 117 in the first frame, and a block of texture 119 in the first frame. FIG. 2b shows the second frame 121, the search space 123 for a block that matches the first frame's block 119, and the best matching block 125. FIG. 2c shows a resulting optic flow vector 127. In the correlation method, to measure the optic flow at a location 117 in the visual field 105 generating the first frame 115, first a block of texture 119 is selected that contains the location 117. Next a search is conducted in the second frame 121 over a search space 123 for the block 125 that best matches the first image's block 119. A correlation function is typically used to measure how well two blocks 119 and 125 match, hence the name of the algorithm. A distance function between the two blocks 119 and 125 can also be used, where the best match is found by minimizing distance. The displacement between the first frame's block 119 and the second framers best matching block 125 is used to form the resulting optic flow vector 127, shown in FIG. 2c. This process is repeated over the entire image 115 to compute a complete optic flow field. To summarize. essentially this algorithm tracks texture and picture details such as points and edges, and uses the resulting displacements to measure optic flow. In more advanced versions of this algorithm, ideas from signal processing and estimation theory can be used to improve performance. For example, Kalman filters can be used to aid the tracking of features over multiple sequential images. A discussion of these techniques is beyond the scope of this invention but can be found in the general open literature.

This method of computing optical flow is intuitive. However it is brute force, and hence computationally intensive when performed on two-dimensional images. However the computational complexity is greatly reduced when performed on one-dimensional images. This is for two reasons: first, because block matching computations need to be performed with blocks of one-dimension rather than two: and second, the range of potential displacements to be searched covers one-dimension rather than two. It will be seen that the photoreceptor array of this invention provides a useful one-dimensional image.

The gradient method of measuring optic flow will now be discussed. The gradient method of computing optical flow assumes that the local shape of the image remains constant while it is moving. Then by comparing the spatial partial derivatives of the image intensity, which contains information on the shape of the image if plotted as a curve, with the temporal partial derivatives, which is how fast the intensity at a location is getting brighter or dimmer, knowledge about the image motion can be had. FIG. 2 is used to explain the gradient method on a one dimensional image. In FIG. 3, shown is a time varying image intensity curse I(x,t) 129, the velocity v 131, the slope of the spatial intensity partial derivative $I_x(x,t)$ 133, and the temporal intensity partial derivative $I_t(x,t)$ 135 are shown. In the gradient method, just like the correlation method, it is assumed that the general shape of the image intensity I(x,t) 129 remains the same but translates at the constant velocity v 131. This assumption is expressed by the mathematical equation $$I(x, t+\Delta t) = I(x - v\Delta t, t).$$

The spatial intensity derivative $I_x(x,t)$ 133, formally given as $$I_x(x, t) \equiv \frac{\partial}{\partial x} I(x, t)$$

expresses how fast the image intensity 129 changes when time is frozen and as the variable x moves in the positive X direction. The temporal intensity derivative $I_t(x,t)$ 135, formally given as $$I_t(x, t) \equiv \frac{\partial}{\partial t} I(x, t)$$

expresses how fast the image intensity at a single location changes as a result of texture motion.

Given the above assumption that the shape of the image remains the same and just translates in time, the spatial partial derivative $I_x(x,t)$ 133 and temporal partial derivative $I_t(x,t)$ 135 follow the relationship $$I_t(x,t) = -vI_x(x,t).$$

Thus $$v = -\frac{I_t(x, t)}{I_x(x, t)}.$$

Therefore if both $I_x(x,t)$ 133 and $I_t(x,t)$ 135 are known, then the image motion v 131 can be estimated.

The values $I_x(x,t)$ and $I_t(x,t)$ are easy to compute when using a one dimensional image. $I_x(x,t)$ can be approximated by $$I_x(x, t) \approx \frac{I(x + \Delta x, t) - I(x, t)}{\Delta x}$$

where $\Delta x$ is the distance between two nearby pixels on the image. Essentially two nearby locations of the image are looked at simultaneously and then their difference computed to approximate the spatial intensity derivative $I_x(x,t)$. Likewise $I_t(x,t)$ can be approximated by $$I_t(x, t) \approx \frac{I(x, t + \Delta t) - I(x, t)}{\Delta t}$$

where $\Delta t$ is the time interval between two samplings of an image location. Essentially the intensity at the image location is looked at twice at two different times, and the change in intensity used to compute the temporal intensity derivative $I_t(x,t)$. The two above methods of estimating the intensity derivatives 133 and 135 is derived straight from basic differential calculus.

In two dimensions the general approach is the same but computationally much more difficult to solve. To understand this difficulty, consider the following problem formulation. Let $I(x,y,t)$ represent the image intensity at point $(x,y)$ at time t. Let $v_x$ and $v_y$ respectively represent the x and y components of the texture velocity. The two spatial derivatives are $I_x(x,y,t)$ and $I_y(x,y,t)$ respectively for the x and y directions. $I_t(x,y,t)$ is how fast the image intensity is changing at one location as a result of texture motion. The spatial gradients and the temporal gradient follows the rule $$I_t(x,y,t) = -v_x I_x(x,y,t) - v_y I_y(x,y,t).$$

There is one equation for the two unknown velocity variables, hence it is impossible to determine the texture motion by looking at this one point. The way this problem is typically addressed in the current art is to first generate a set of equations by applying the above rule over a set of points in the image. Then a set of additional constraints is used to find solutions to these equations. An example of such a constraint is to assume that the texture motion in nearby locations is similar, thus causing an algorithm to favor solutions with such characteristics. Much work has been performed in this general technique, however the best algorithms are still computationally intensive.

Some researchers have taken the alternative approach of building application specific integrated circuits (ASICs) that use a combination of digital and analog circuitry to measure optical flow. The idea behind this approach is that specifically designed analog and digital circuits can perform the computations necessary to measure optical flow in a much more compact fashion than is possible with a general purpose Von-Neumann type computer. This is especially useful if the implemented algorithm is one that can be mapped onto an array of parallel processors. These efforts have resulted in single or multiple chip systems that measure optical flow. However the vast majority of these chips still use a two-dimensional pixel-structured representation of the image, which is not necessarily a good representation for optical flow computation. Furthermore in many of these cases the circuits implement hard-wired versions of conventional algorithms. Thus the speed increase comes only from implementing an algorithm in digital hardware rather than software. Speed increases that could be had by using algorithms that map elegantly into the hardware are ignored. Finally a significant problem with most of these chips is that they do not function well with low contrast images.

The present invention overcomes the problems of computational complexity by using specially shaped photoreceptor circuits to generate a one-dimensional image representation of the two-dimensional visual field region of interest. These photoreceptor circuits preserve information in one direction of the two dimensional visual field while eliminating information in the perpendicular direction. This transformation is performed entirely with optics and simple analog circuitry. Then optic flow is measured by giving the one-dimensional image to an optic flow algorithm. The required computing power is reduced because one-dimensional optic flow is significantly easier to compute than two-dimensional optic flow. However as a result of the photoreceptors having an orientation in the visual field, the one-dimensional optic flow measurement has meaning in the two dimensional visual field. As will be discussed, several of these sensors placed in the same area of the visual field and oriented in different directions can extract two dimensional optic flow information.

SUMMARY OF THE INVENTION

It is therefore an object of the invention to provide a novel linear photoreceptor array optic flow sensor.

Another object of the invention is to provide a linear array of phototreceptors that covers a small section of a two-dimensional image and generates a linear (one-dimensional) image representation with relatively few pixels.

A further object of the invention is to provide a photoreceptor array related to the field of visual motion sensing chips.

These and other objects of the invention are achieved by providing a linear optic flow sensor which comprises a plurality of elongated photoreceptor circuits arranged in a linear array and being responsive to a visual field for producing a plurality of photoreceptor signals and means responsive to the plurality of photoreceptor signals for measuring one-dimensional optic flows to provide an output comprised of a speed measurement, a direction measurement, and both a speed and direction measurement, whereby a one-dimensional optic flow measurement comprising a measurement of a projection vector is obtained from said output.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIGS. 14a and 14b show how an array of point photoreceptors can be connected to form virtual photoreceptor rectangles, with FIG. 14a showing the array of photoreceptors and possible rectangles, and FIG. 14b showing how to electrically connect phototransistors;

FIGS. 15a through 15c show alternate photoreceptor layouts;

DESCRIPTION OF THE INVENTION

1. General Purpose of the Invention

Figure 1:
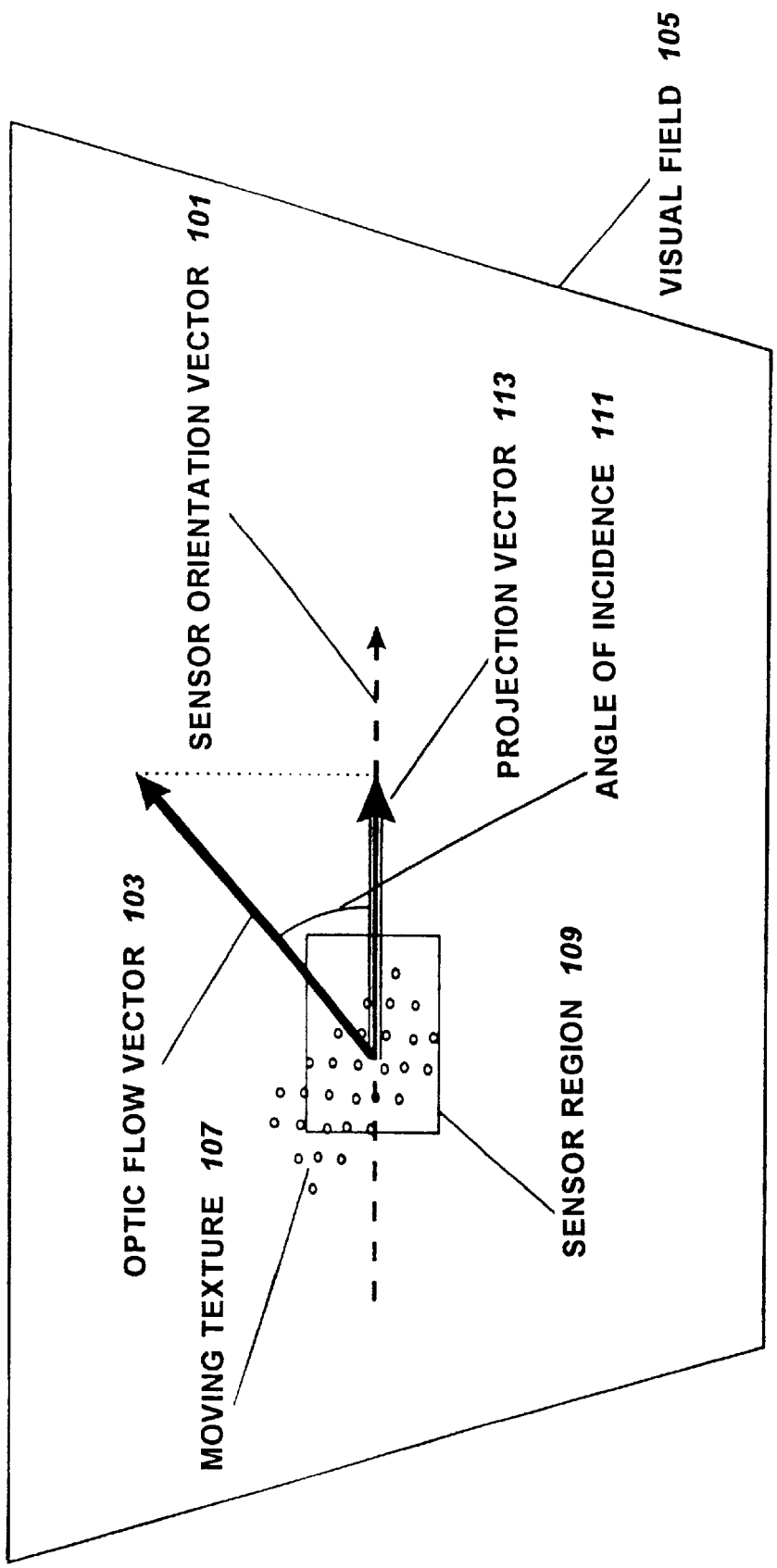
FIG. 1 shows the projection of the 2-D optic flow vector onto the vector representing the sensor orientation.

The sensor described in this application is designed to extract the optic flow in one direction in one small section of the visual field. The sensor has an orientation in the two-dimensional visual field. The output of the sensor depends on both the optic flow and the sensor's orientation. FIG. 1 shows the sensor orientation vector 101, the optic flow vector 103, and the two-dimensional visual field 105 in which these vectors are located. Also shown is texture 107 which moves at the velocity specified by the optic flow vector 103, the sensor region in the visual field 109, the texture motion angle of incidence 111, and the projection vector 113. The visual field 105 represents the environment as experienced by the sensor. For the sake of discussion, the range of the visual field 105 can be formulated either as azimuth and elevation angles from the sensor to texture in the environment, or as the two-dimensional space on a camera focal plane. Both contexts are valid in the present invention. The sensor orientation vector 101 represents a direction in the visual field 105 in which the sensor is oriented. The optic flow vector 103 represents the two-dimensional motion of texture 107 in the sensor region 109. For example, if the sensor region of the visual field 109 is occupied by a tree moving left at ten degrees per second, then the optic flow vector 103 will be pointed left and have a magnitude that represents ten degrees per second. The sensor's location in the visual field is defined as follows: suppose the sensor is part of an imaging device that includes a lens and a focal plane. If a tree in the environment is positioned so that it's image on the focal plane lands on the sensor, then it is said that the tree is at the sensor's location in the visual field.

The output of the sensor is a measurement of the trigonometric projection of the optic flow vector 103 onto the sensor orientation vector 101. This vector is shown in FIG. 1 as the projection vector 113. The angle between the sensor orientation vector 101 and the optic flow vector 103 is called the angle of incidence 111. If the optic flow vector 103 is parallel to the sensor orientation vector 101, the sensor will measure the true magnitude of the optic flow vector 103. Likewise if the sensor orientation vector 101 is pointed right and optic flow vector 103 points diagonally right and upward at 45 degrees at 10 degrees per second, then the sensor will detect motion to the right at 10 cos(45 degrees)= 7.07 degrees per second. The sensor also reports a direction value, depending on whether the projection vector 113 is in the same direction or the opposite direction as the sensor orientation vector 101. If the projection vector 113 is in the same direction as the sensor orientation vector 101, the sign is positive. If these two vectors are pointed in opposite directions, the sign is negative.

The sensor is robust against most artifacts in the image that might cause the sensor to mistakenly detect motion in the wrong direction. The sensor's performance is optimal when the sensor orientation vector 101 is parallel to the optic flow vector 103. The performance will degrade as the angle of incidence approaches 111 near 90 degrees. How close the angle of incidence 111 can approach 90 decrees while maintaining a desired performance is a function of the specific implementation. This shall be discussed in a subsequent section.

Figure 4:
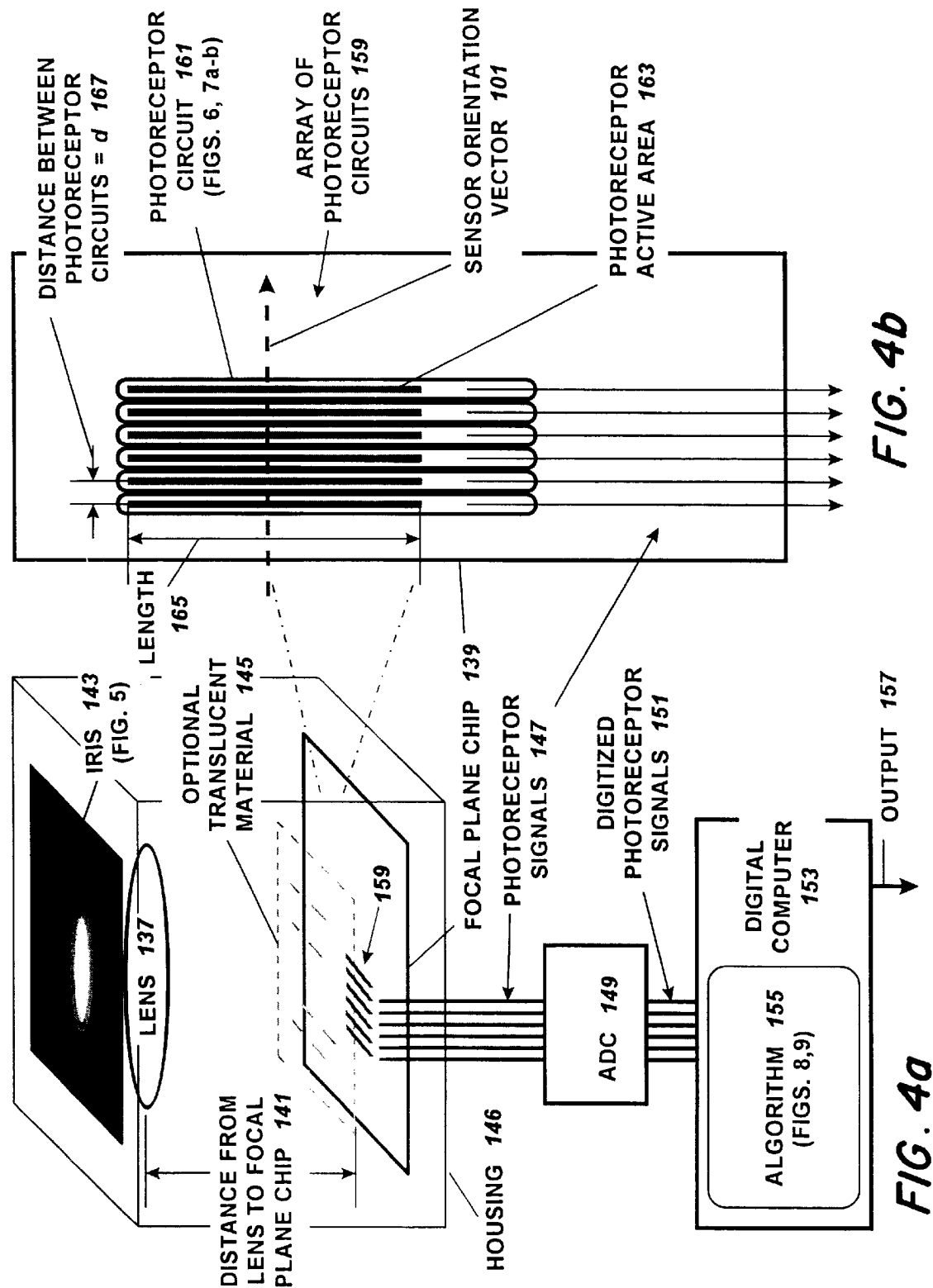
FIGS. 4a and 4b show the structural elements of a first preferred embodiment.

Referring now to a first embodiment shown in FIGS. 4a and 4b, the present invention addresses the high computational complexity required for optic flow algorithms that operate in two dimensions by using a combination of optics and algorithms. With the use of optics and specially shaped photoreceptors, a one dimensional image representation of the visual field 105 (FIG. 1) is produced that preserves information in the sensor orientation direction 101 (FIG. 1) while filtering out information in the perpendicular direction. This one dimensional image is then digitized and given to a one dimensional optic flow algorithm. Almost any one-dimensional optic flow algorithm can be used, however two algorithm examples are presented. The first algorithm is based on the gradient method and the second algorithm is based on the correlation method. As described in the background art section, one dimensional optic flow algorithms are significantly less complex than their corresponding two dimensional versions. The output of the algorithm is a measure of the projection vector 113 (FIG. 1), which is the projection of the two dimensional optic flow vector 103

(FIG. 1) onto the sensor orientation vector 101 (FIG. 1). The main benefit of measuring optic flow by this method is that several sensors can be placed in the same region 109 (FIG. 1) of the visual field but oriented in different directions. Then simple vector arithmetic can be used to measure two-dimensional optic flow.

The present invention is simple and best introduced by immediately explaining the first preferred embodiment. First to be considered is the structural elements of the first embodiment. Discussed is the structure and operation of the sensor, including theory on why it works. Second, the second preferred embodiment will be discussed. Finally a number of alternatives and additions to the two embodiments are considered.

2. The First Preferred Embodiment

Static Description

FIG. 4a shows the main structural elements of the first preferred embodiment of this invention. This embodiment is selected as the first preferred embodiment because it has been implemented and tested, it is easy to fabricate and implement, and in the opinion of the applicant it anticipates the technological trend toward single chip systems involving embedded microcontrollers. A lens 137 focuses light from the visual field 105 (FIG. 1) onto a focal plane chip 139 which contains an array of P photoreceptor circuits 159 (FIG. 4b). The distance 141 between the lens 137 and the focal plane chip 139 is set so that the image formed on the focal plane chip 139 is slightly out of focus. An optional iris 143 can be placed on top of the lens 137, as shown in FIG. 4a, or between the lens 137 and the focal plane chip 139. Optionally, a layer of translucent material 145 can be placed between the lens 137 and the focal plane chip 139, near the focal plane chip 139. The contents of the focal plane chip 139 will be discussed shortly. A housing 146 provides physical support for the lens 137, the iris 143, the translucent material 145, and the focal plane chip 139, and ensures that only light entering through the lens 137 and iris 143 strikes the photoreceptor circuits 159 (FIG. 4b). Coming off the chip 139 is an array of P photoreceptor signals 147. These photoreceptor signals 147 are then digitized by an analog to digital converter 149 to generate digitized versions of the photoreceptor signals 151. The digitized photoreceptor signals 151 are then applied to a digital computer 153. The digital computer 153 contains in it's memory an algorithm 155 which computes one dimensional optic flow. By running the algorithm 155, the digital computer 153 provides the sensor output 157.

FIG. 4b shows the contents of the focal plane chip 139. An array of P photoreceptor circuits 159 is arranged in a linear array aligned with the sensor orientation vector 101. Each photoreceptor circuit 161 has an active area 163 which responds to light striking the focal plane chip 147. The active area is shaped like an elongated or very long rectangle of a predetermined length l 165. The photoreceptor circuits are arranged so that the rectangular shaped active areas 163 are oriented perpendicular to the sensor orientation vector 101 and separated by a distance d 167. By "elongated", it is meant that the length l of a photoreceptor circuit 159 is many times longer than either the width of the photoreceptor circuit or the distance d 116. As will be discussed below, making the photoreceptor circuits elongated causes the optic flow algorithm 155 to measure specifically the length of the projection vector 113. Each photoreceptor circuit 161 generates one of the photoreceptor signals 147 that is provided by the focal plane chip.

Also shown in FIGS. 4a and 4b are references to other figures used to describe the individual structural elements. These structural elements sill now be considered in more detail:

FIG. 4a depicts the placement of the different optical components, which are the lens 137, the optional iris 143, the optional translucent material 145, and the focal plane chip 139. Much like in a camera, the lens 137 focuses an image of the visual field 105 (FIG. 1) onto the focal plane chip 139. Unlike a camera, the distance 141 between the lens 137 and the focal plane chip 139 is set so that the image is slightly blurred. The lens 137 can be any suitable type of convex lens. However the lens 137 should have a focal length on the order of between less than a millimeter to several centimeters, depending on the physical geometry of the photoreceptor circuits 159 and on the desired shape of the sensor's region in the visual field 105.

Figure 5:
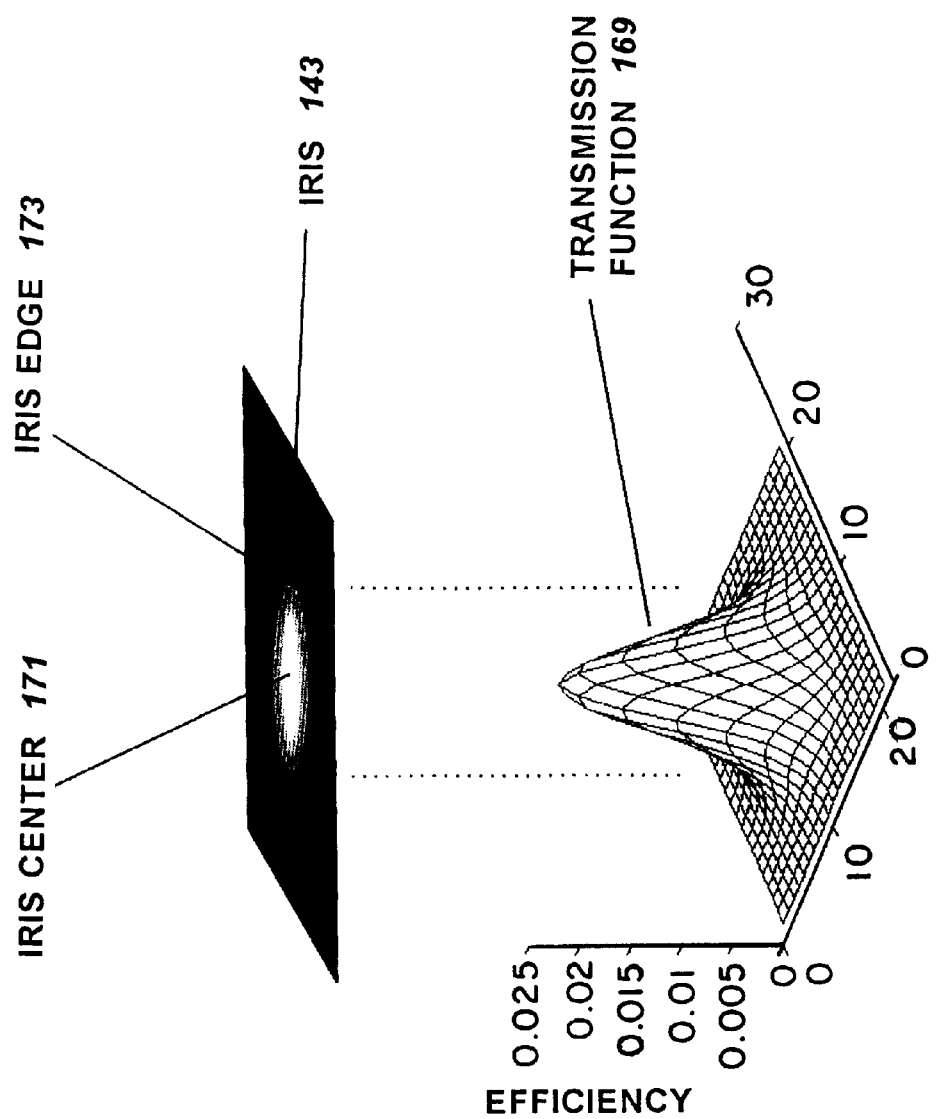
FIG. 5 shows the transmission efficiency of the iris.

The iris 143 is located either before the lens 137 or between the lens 137 and the focal plane chip 139. FIG. 5 shows the iris 143 and it's transmission function 169. The transmission function 169 represents the efficiency with which light passes through different parts of the iris 143. This iris 143 can be made with a graded shading, which means that the efficiency function can have values between 0% to 100%. This iris 143 is different from an iris found in a conventional camera, where light is either totally passed or totally stopped. Note though that a conventional iris can be used, but the blurring of the image on the focal plane would be more difficult to control. The shape of the transmission function 169 should mimic the shape of a simple two-dimensional low-pass filter, as shown in FIG. 5. Thus, light is transmitted with full efficiency at the center 171 of the iris 143 and with decreasing efficiency towards the edge 173 of the iris 143.

Perhaps the simplest method of constructing iris 143 is using photographic film. A camera can be used to take a picture of a "blurry white circle" on either a slide or a negative. Then this picture can be cut out and used for the iris 143. More specifically, first a circle can be cut out from white paper and then placed onto a very black surface, such as black fabric or construction paper. Next, using a camera loaded with slide film, a picture of the white circle on the black fabric can be taken with the camera out of focus, thus blurring the image of the circle. Ensure that the circle is cleanly inside the boundary of the picture. Develop the film. Use the resulting slide as the iris 143, with the white circle part of the picture as an iris opening. Care must be taken to ensure that the resulting iris 143 is smaller in size than the lens 137.

Figure 6:
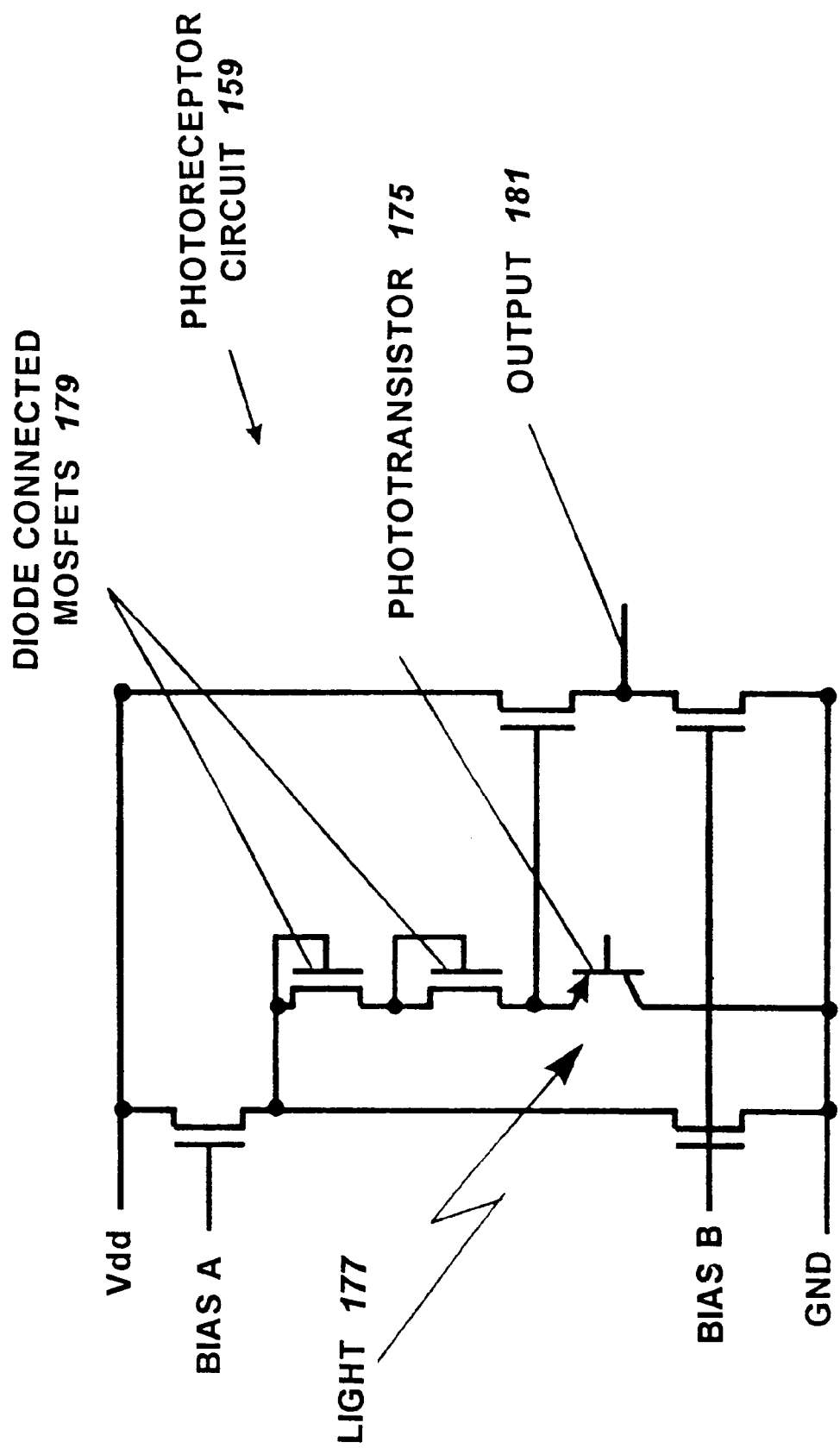
FIG. 6 shows a schematic of a photoreceptor circuit.

FIG. 6 shows the schematic diagram of an individual photoreceptor circuit 159. The main component is a phototransistor 175. The amount of current flowing through the phototransistor 175 is proportional to the light 177 striking it. Diode-connected metal-oxide-semiconductor field-effect transistors (MOSFETs) 179 transduce the current flowing through phototransistor 175 to a voltage signal, which is buffered then given as the photoreceptor output 181. The diode connected MOSFETs 179 are relatively wide, thus they are biased in the subthreshold region. Thus, the voltage drop across them is a logarithmic function of the light 177 intensity striking the phototransistor 175. This allows several orders of magnitude of right intensity to be encoded in a relatively small voltage swing. This technique of building a photoreceptor circuit is adapted from the contents of the book *Analog VLSI and Neural Systems*, by Carver Mead.

Figures 7A, 7B:
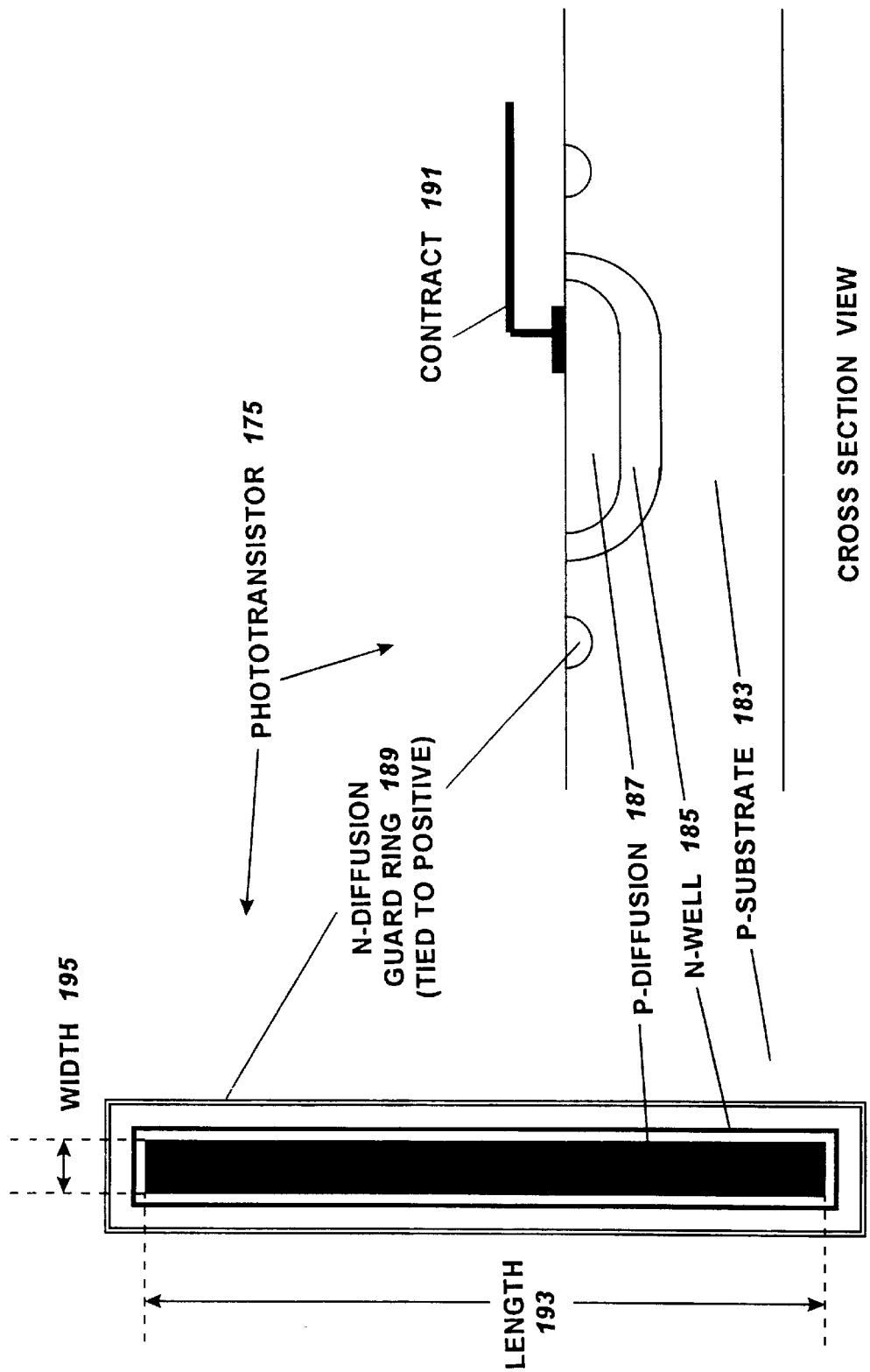
FIGS. 7a and 7b show the vertical parasitic PNP phototransistor, with FIG. 7a showing a top-view and FIG. 7b showing a cut-through view.

FIGS. 7a and 7b respectively show a top view and a cross-section view of the preferred way of implementing the phototransistor 175 (from FIG. 6), which is implemented on the focal plane chip 139 (FIG. 4a). The phototransistor 175 itself forms the photoreceptor circuit's active area 163 (FIG. 4b). Shown is the focal plane chip's P-substrate 183, an N-well 185, P-diffusion 187, a guard ring 189, a contact 191, and the phototransistor's length l 193 and width w 195. The phototransistor's length 193 is thus the corresponding photoreceptor circuit active area's length l 165 (FIG. 4b). This is actually a parasitic vertical PNP transistor that is a byproduct of any N-well complementary metal-oxide-semiconductor (CMOS) integrated circuit fabrication process. When light strikes the phototransistor 175, electron-hole pairs form in the region between the N-well 185 and the P-diffusion 187. This allows current to flow from the contact 191 to the P-substrate 183, which forms the phototransistor's 175 collector. The P-diffusion 187 forms the phototransistor's 307 emitter. The P-diffusion 187 is connected via the contact 191 to the diode connected MOSFETs 179, as shown in FIG. 6. An N-diffusion guard ring 189 circles the phototransistor 175 to provide electrical isolation from other components on the focal plane chip 139 (FIG. 4a). This guard ring 189 is tied to a positive power supply voltage. This method of creating the phototransistor 175 is also adapted from *Analog VLSI and Neural Systems*. Note that other forms of bipolar transistors can be used. Of special significance are the phototransistor's length 193 and width 119 dimensions. As stated before, the length 193 is significantly longer than the width 195 so that the phototransistor is shaped like a long rectangle.

Figure 8:
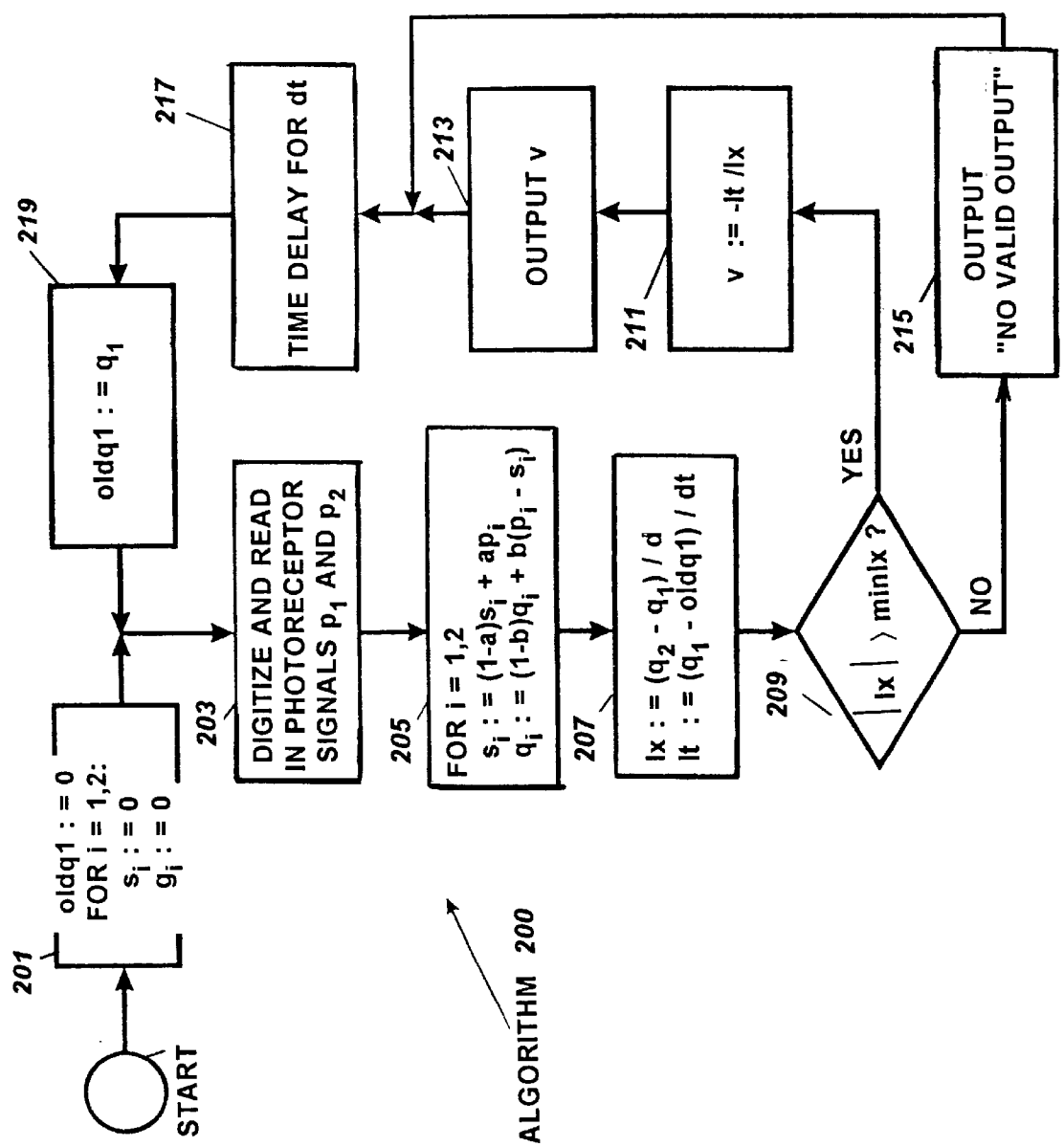
FIG. 8 illustrates a possible algorithm for the first preferred embodiment that implements a one-dimensional gradient optic flow algorithm.
Figure 9:
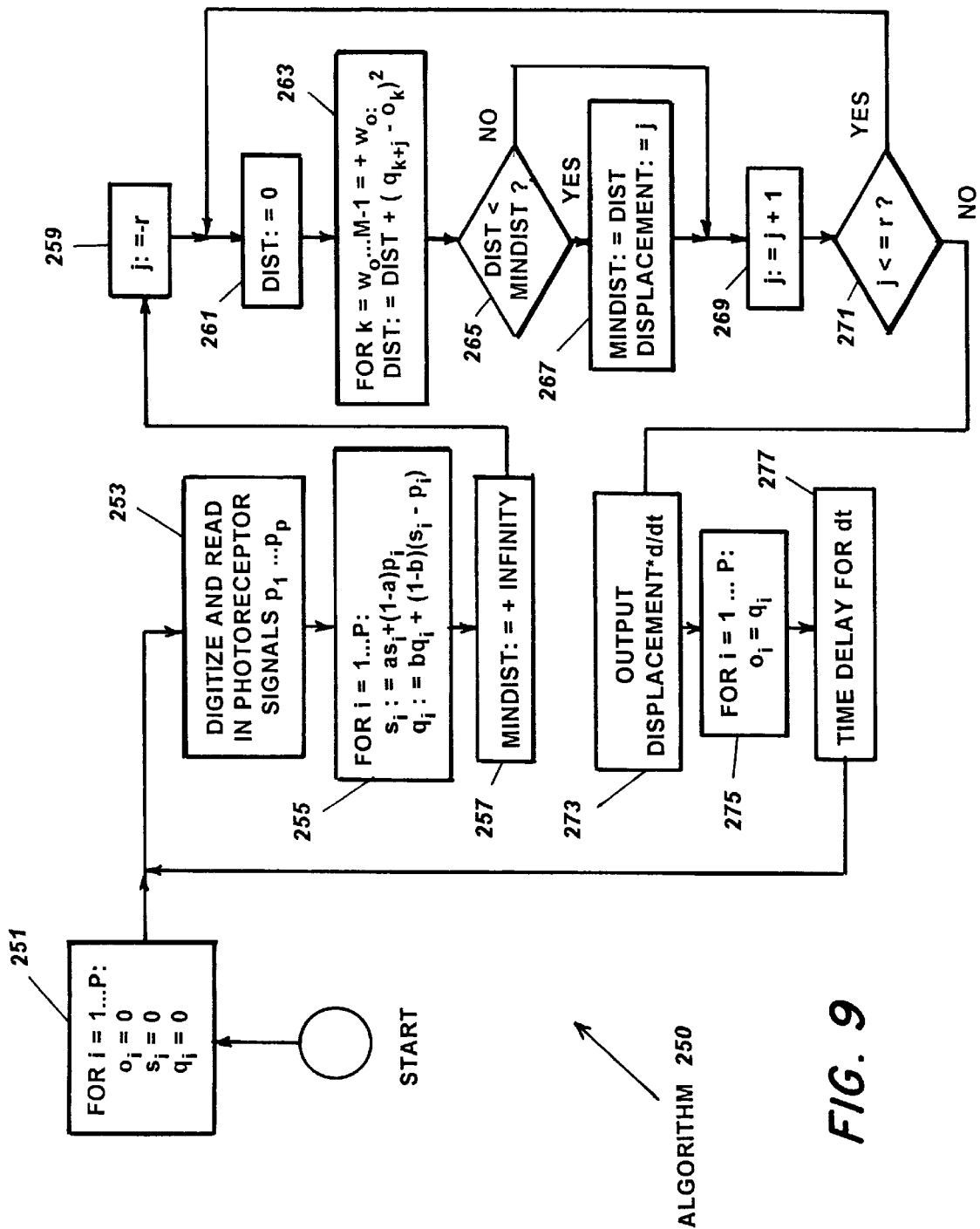
FIG. 9 illustrates a possible algorithm for the first preferred embodiment that implements a one-dimensional correlation optic flow algorithm.

As described above and shown in FIG. 4a, the photoreceptor signals 147 are then sent to an analog to digital converter (ADC) 149 to generate digitized photoreceptor signals 151. A digital computer 153 then processes these digitized photoreceptor signals 151 with an algorithm 155 (to be discussed). The algorithm 155 both performs simple filtering to remove noise and offset errors between photoreceptor circuits and a one dimensional optic flow algorithm on the processed signals. FIGS. 8 and 9 show two examples of algorithms that can be used. These algorithms are based upon the two methods of computing optic flow discussed in the prior art section. The algorithms to be discussed with FIGS. 8 and 9 implement one-dimensional image versions respectively of the gradient and correlation methods of measuring optic flow. In addition to the basic optic flow computation, each algorithm includes steps to high-pass and low-pass the digitized photoreceptor signals 151. The reasons for including these steps shall be discussed in the next section. It should be noted that 1) the following algorithms can be modified and improved in many ways, for example by allowing one or more of the parameters to adjust to the current environment, and 2) other types of optic flow algorithms can be used, for example the algorithm or method described in the co-pending patent application entitled "A Feature Tracking Linear Optic Flow Sensor", referenced at the beginning of this application. All such variations are deemed within the scope of the present invention.

ALGORITHM 200 (FIG. 8)

FIG. 8 shows an algorithm 200 based on the gradient scheme of measuring optic flow. The photoreceptor circuit array 159 (FIG. 4b) requires just two photoreceptor circuits if this algorithm 200 is to be used. Thus there are two photoreceptor signals 147. The difference between the two photoreceptor signals 147 is used to estimate the spatial intensity partial derivative 133 while the variation of one photoreceptor signal 147 in time is used to estimate the temporal intensity partial derivative 135. The algorithm 200 also includes steps to turn off the output 157 if there is insufficient contrast in the visual field 105 to generate and accurate measurement. The algorithm 200 is presented in the following manner: First, a table of the individual variables and parameters used in the algorithm 200 are shown. Second, a brief description of the steps is given as an overview. Third, a detailed description of the steps of algorithm 200 is given.

TABLE

ALGORITHM 200 VARIABLES

| Variable or Parameter | Description |
| --- | --- |
| $p_1, p_2$ | Digitized photoreceptor signals 151 (FIG. 4a) |
| $s_1, s_2$ | State variables for high pass filtering |
| $q_1, q_2$ | Filtered digitized photoreceptor signals |
| lx | Estimated spatial intensity derivative (i.e. 133, FIG. 3) |
| oldq1 | Value of $q_1$ in previous time step |
| lt | Estimated temporal intensity derivative (i.e. 135, FIG. 3) |
| minlx | Parameter: minimum spatial intensity derivative 133 (FIG. 3) for the measured velocity to be considered valid |
| dt | Time delay used for time discretization |
| d | Distance 167 (FIG. 4b) between photoreceptor circuits 159 (FIG. 4b) |
| v | Output velocity 157 (FIG. 4a) |

BRIEF DESCRIPTION OF ALGORITHM 200 STEPS

| Step | Brief Description of Steps |
| --- | --- |
| 201 | Initialization |
| 203 | Read in digitized photoreceptor signals from ADC |
| 205 | High-pass and low-pass filtering to remove noise and offset |
| 207 | Compute lx and lt |
| 209 | Determine if a valid output can be generated |
| 211 | Compute velocity from lx and lt |
| 213 | Output velocity |
| 215 | Output that no valid output can be generated |
| 217 | Time delay by dt to control time discretization |
| 219 | Copy $q_1$ into oldq1 |

DETAILED DESCRIPTION OF ALGORITHM 200 STEPS

Step 201 is for initializing various variables.

Step 203 is where the ADC 149 (FIG. 4a) is directed to sample and digitize the photoreceptor signals 147 (FIG. 4a) and where the digital computer 153 (FIG. 4a) inputs the digitized photoreceptor signals. Depending on the specific implementation, this step could consist simply of reading in the digitized photoreceptor signals 151 (FIG. 4a) or could be a complex algorithm directing the process by which the ADC 149 (FIG. 4a) digitizes the photoreceptor signals 147 (FIG. 4a). The digitized photoreceptor signals 151 (FIG. 4a) are stored in the $p_i$ variables (i.e. $p_1$ and $p_2$).

Step 205 is a step implementing high-pass and low-pass filtering. The filtered versions of the digitized photoreceptor signals 151 (FIG. 4a) are stored in the $q_i$ variables. This step will be discussed in greater detail in the section describing the dynamic operation of this preferred embodiment. That discussion will also describe how to choose parameters a and b.

Step 207 is where Ix and It are computed. These are respectively the estimated spatial 133 (FIG. 3) and temporal 135 (FIG. 3) intensity derivatives. Ix is computed by taking the difference between the current filtered photoreceptor signals $q_1$ and $q_2$. It is computed by taking the difference between the current ($q_1$) and the past (oldq1) filtered digitized photoreceptor signals from the first photoreceptor circuit.

Step 209 checks whether the absolute value of Ix is greater than the threshold minIx. If affirmative, then the algorithm computes the velocity in step 211 and outputs the computed velocity in step 213. This measured velocity becomes the output 157 (FIG. 4a) provided by the computer 153 (FIG. 4a). If negative, then the algorithm gives "no valid output" as an output. The method used to encode "no valid output" depends on the specific requirements of the application using this invention. It is suggested that the parameter minIx be set to root-mean-square (rms) value of typically encountered Ix values. Optionally minIx may be adjusted until |Ix|>minIx about half the time.

The reason for performing step 209 is to "turn off" the sensor output 157 (FIG. 4a) when the contrast of texture in the visual field 105 (FIG. 1) is too small to allow an accurate measurement. When the contrast is small, Ix has a small magnitude. Then minor variations in Ix due to noise and due to the numerical approximation of the spatial intensity derivative 113 (FIG. 3) significantly distort the velocity measurement performed in step 211.

Step 217 implements a time delay where the algorithm halts for a duration dt. The value dt dictates how fast time is to be discretized, how often the photoreceptor signals 147 are to be digitized, and how fast the sensor generally operates. Clearly the value dt depends on the specific implementation and on the specific application. It is suggested that the value of dt be less than one tenth the minimum time under normal conditions that texture would move between the two photoreceptor circuits 159 (FIG. 4b) providing the photoreceptor signals $p_1$ and $p_2$.

Figure 3:
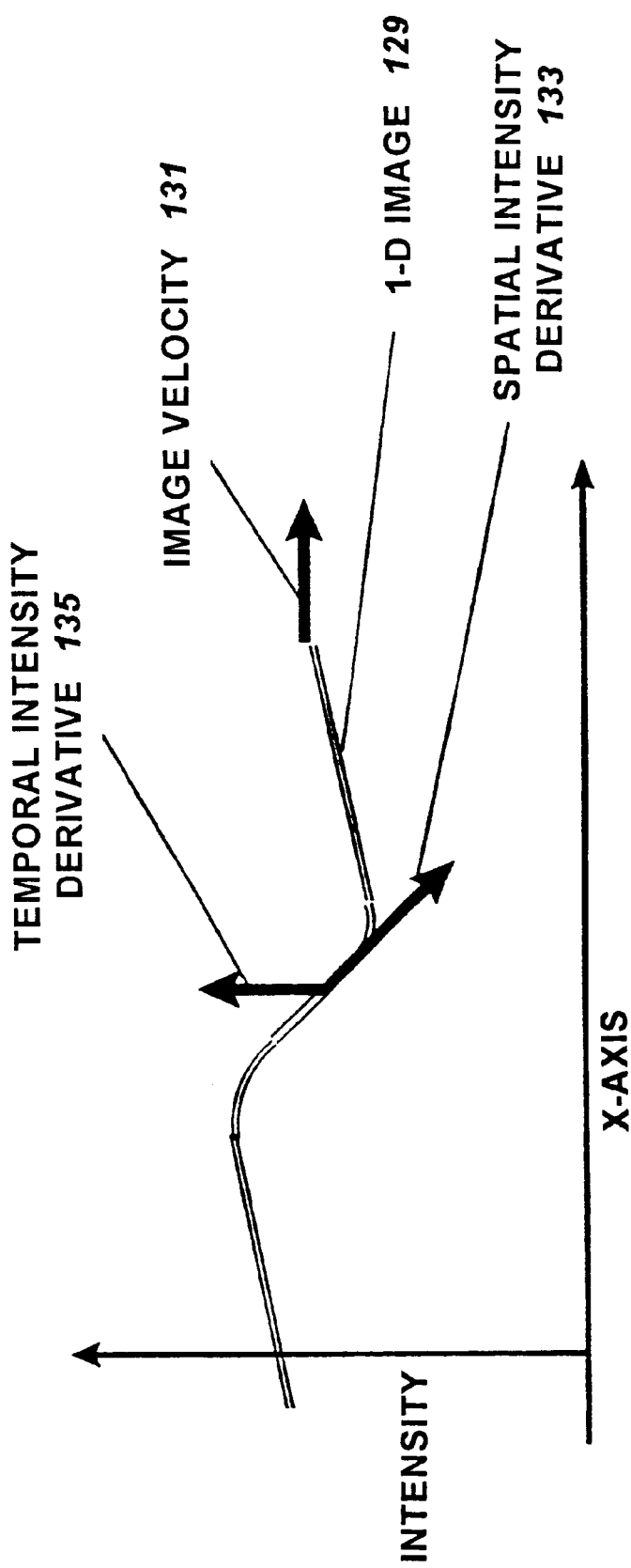
FIG. 3 shows the gradient method of optical flow computation as used in conventional image processing.

The spatial intensity derivative Ix 133 (FIG. 3) and the temporal intensity derivative It 135 (FIG. 3) are computed exactly in the manner discussed in the previous art section and in FIG. 3. Step 209 is used to ensure that there is enough constrast in the image to compute optic flow: if the magnitude of Ix is less than the threshold set by min_Ix, then the sensor does not present a measurement. Otherwise the velocity is computed and given as an output in steps 211 and 213. Step 217 is a simple time delay used to discretize time.

Step 219 is where the variable oldq1 stores the value $q_1$. This is in preparation for the next execution of step 207.

ALGORITHM 250 (FIG. 9)

Figure 2:
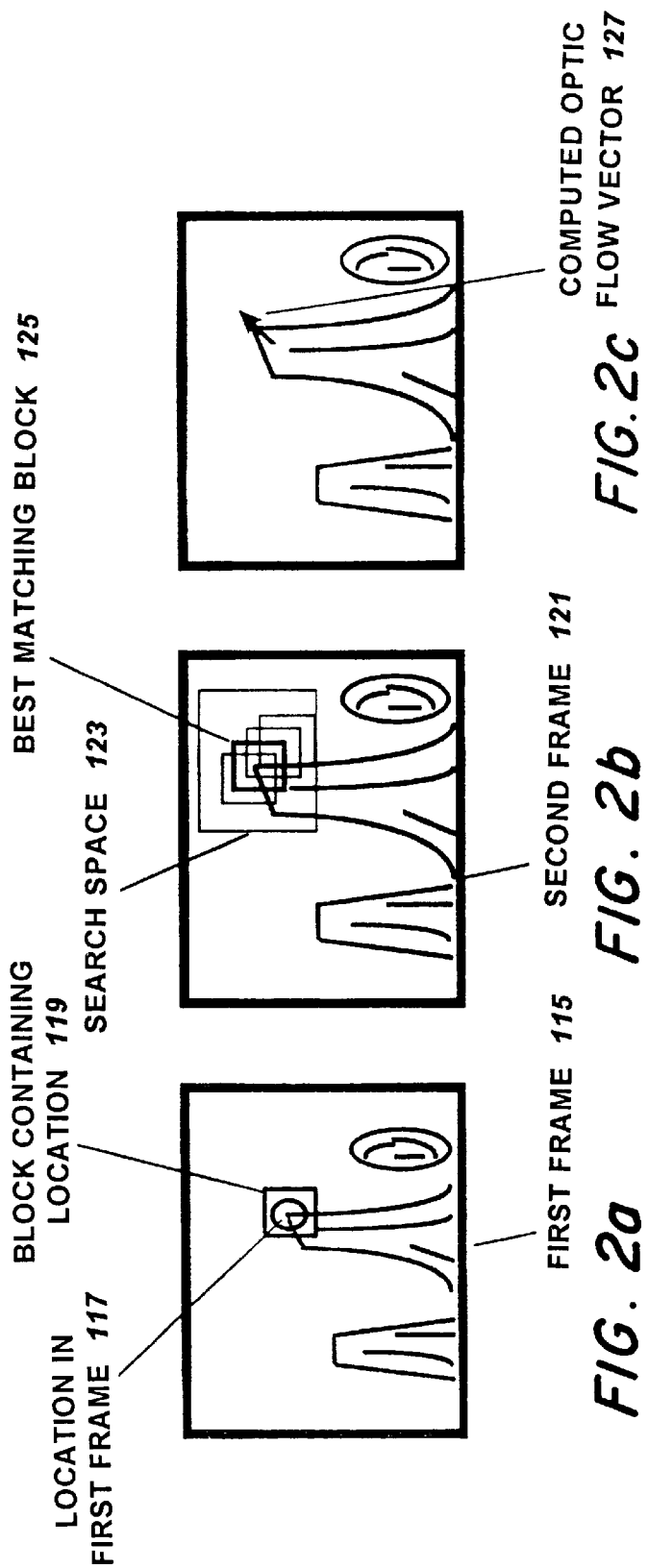
FIGS. 2a through 2c show the correlation method of optical flow computation as used in conventional image processing.

FIG. 9 shows an algorithm 250 based upon the correlation scheme of measuring optic flow. A total of P photoreceptor circuits 163 is used in the array. To be practical, P should be at least 20. This algorithm will be presented in the same manner as algorithm 200 from FIG. 8. This algorithm essentially performs the same computations described above in the prior art section for the correlation algorithm. The difference is that the two frames 115 and 121 (FIGS. 2a and 2b), the search space 123 (FIG. 2b), and the texture blocks 119 and 125 (FIGS. 2a and 2b) are all one dimensional rather than two dimensional. All the reference numerals referring to FIGS. 2a through 2c should be interpreted as referring to a one-dimension version of these figures.

TABLE OF ALGORITHM 250 VARIABLES

| Variable or Parameter | Description |
| --- | --- |
| $p_1 \ldots p_P$ | Current digitized photoreceptor signals 151 (FIG. 4a) 1 through P |
| $q_1 \ldots q_P$ | Current filtered digitized photoreceptor signals 1 through P, i.e. the "second frame 121 (FIG. 2)" |
| $o_1 \ldots o_P$ | Old (from previous time step) filtered digitized photoreceptor signals 1 through P. i.e. the "first frame 115 (FIG. 2)" |
| $s_1 \ldots s_P$ | State variables for high pass filtering |
| I | Loop index used for filtering |
| mindist | Minimum distance value, for finding best matching texture block 125 (FIG. 2b) in second frame 121 (FIG. 2b) |
| $w_0$ | Center of search space 123 (FIG. 2b) in second frame 121 (FIG. 2b) |
| M | Size of texture block 119 (FIG. 2a) in pixels (photoreceptor signals 147 (FIG. 4a)) |
| r | Range of the search space 123 (FIG. 2b) for best matching texture block 125 (FIG. 2b) search space 123 (FIG. 2b) covers $w_0-r$ through $w_0+r$ |
| j | Loop index used in searching through search space 123 (FIG. 2b) |
| dist | Distance between texture block 119 (FIG. 2a) and texture block in search space 123 (FIG. 2b) currently being examined |
| k | Loop index used to compute distance between texture block 119 (FIG. 2a) and texture block in search space 123 (FIG. 2b) under consideration |
| d | Distance between photoreceptor circuits 167 (FIG. 4b) |
| displacement | Displacement between texture block 119 (FIG. 2a) and best matching texture block 125 (FIG. 2b) - this becomes the output 157 (FIG. 4a) of the sensor |
| dt | Parameter used for time delay |

BRIEF DESCRIPTION OF ALGORITHM 250 STEPS

| Step | Brief Description of the Steps |
| --- | --- |
| 251 | Initialization |
| 253 | Read in digitized photoreceptor signals 151 (FIG. 4a) from ADC 149 (FIG. 4a) |
| 255 | High-pass and low-pass filtering to remove noise and offset |
| 257 | Initialize mindist to high value (infinity) to prepare for search for best matching block 125 (FIG. 2b) |
| 259, 269, 271 | Loop j through texture block locations (smallest index or index of left-most pixel) in search space 123 (FIG. 2b) |
| 261, 263 | Compute distance between texture block 119 (FIG. 2a) and texture block in second frame 121 (FIG. 2b) under consideration |
| 265, 267 | Update mindist and displacement as necessary to find best matching block 125 (FIG. 2b) |
| 273 | Output displacement 127 (FIG. 2c) |
| 275 | Save current digitized filtered photoreceptor signals into variables used for old - i.e. copy the second frame 121 (FIG. 2b) into the first frame 115 (FIG. 2a) |
| 277 | Implement time delay |

DETAILED DESCRIPTION OF ALGORITHM 250 STEPS

It should be noted that the steps shown in FIG. 9 follow the correlation optic flow algorithm discussed in the prior art section. High-pass and low-pass filtering is performed on the digitized photoreceptor signals 151 (FIG. 4a) to generate the variables $q_i$, which collectively form the second frame 121 (FIG. 2b). The variables $o_i$ are equal to the contents of the variables $q_i$ at the previous time step, and hence form the first frame 115 (FIG. 2a). The texture block 119 (FIG. 2a) is M pixels or photoreceptor signals 147 (FIG. 4a) wide and is located so that the lowest indexed photoreceptor signal (left-most) is located at pixel $w_0$. The variable r defines the range of the search space 123 (FIG. 2b)—the search space 123 (FIG. 2b) extends from $w_0-r$ to $w_0+r$. For example, suppose that P=40, M=10, $w_0$=15, and r=5. Then the two frames 115 (FIG. 2a) and 121 (FIG. 2b) have forty pixels each and the texture block 119 (FIG. 2a) has 10 pixels and spans the previous time step photoreceptor signals $o_{15}$ through $o_{24}$ (i.e. the filtered digitized photoreceptor signals 151 (FIG. 4a) at the previous time step from photoreceptor circuits 15 through 24). The search space 123 (FIG. 2b) would start with the texture block in the second frame 121 (FIG. 2a) covering photoreceptor signals 10 through 19 and end with the block covering photoreceptor signals 20 through 29. The simple Euclidean distance measure is used to compute the match between texture block 119 (FIG. 2a) and a texture block in the search space 123 (FIG. 2b). Thus the best matching block 125 (FIG. 2b) is the one with the minimum distance to the block 119 (FIG. 2a).

The algorithm steps are described in greater detail as follows:

Step 251 performs initialization of the first 115 (FIG. 2a) and second 121 (FIG. 2b) frames, and of the state variables used for high-pass filtering.

Step 253 is where the digitized photoreceptor signals 151 (FIG. 4a) are read from the ADC 149 (FIG. 4a).

Step 255 performs high-pass and low-pass filtering on the digitized photoreceptor signals 151 (FIG. 4a). The reasons for including this step as well as how to select values for parameters a and b are discussed in a later section.

Step 257 sets mindist to a high value in preparation for the search in the search space 123 (FIG. 2b) for the best matching block 125 (FIG. 2b).

Steps 259, 269 and, 271 control the search over the search space 123 (FIG. 2b) by letting index variable j loop through the range of displacements, which is from –r to r. Thus the values $w_0-r$ through $w_0+r$ make up the search space 123 (FIG. 2b). The location of a texture block under consideration for each pass through this loop is the value $w_0+j$.

Steps 261 and 263 compute the distance between the texture block 119 (FIG. 2a) and a texture block under consideration in the search space 123 (FIG. 2b). This is done by computing a sum of the squares of the differences between the values of corresponding pixels of the two texture blocks being compared.

Steps 265 and 267 compare the computed distance with the smallest distance seen so far. If the distance between the texture block 119 (FIG. 2a) and the texture block under consideration in the search space 123 (FIG. 2b) is smaller than any distance seen so far in the search space at the current time (i.e. while going through the loop defined by steps 259, 269, and 271), the values mindist and displacement are updated. Thus, when the loop defined by steps 259, 269, and 271 is exited, displacement will store the displacement between texture block 119 (FIG. 2a) and the best matching texture block 125 (FIG. 2b).

Step 273 outputs the value displacement scaled appropriately according to d and dt. This provides the output 157 (FIG. 4a), which is always given in this algorithm 250. The unit value of the output 157 is in distance units per second.

Step 275 copies the contents of the second frame 121 (FIG. 2b) into the first frame 115 (FIG. 2a), so that a new second frame 121 (FIG. 2b) can be read in step 253.

Step 277 implements a delay of duration dt. The algorithm 250 here freezes for dt seconds. This delay step controls how fast time is quantized.

All of the variables P, M, $w_0$, r, and dt are applicaton dependent. More specifically, these values depend on 1) how accurate a measurement is desired, 2) what range of optic flow velocities could be expected, and 3) the nature of the texture 107 in the visual field 105. For example, higher accuracy implies that P and M should be increased. A wider range of velocities means that r should be increased. Faster motion will require a smaller value of dt. It is suggested that the following values be attempted first: P=40, M=10, $w_0$=15, and r=14.

It should be noted that in this first embodiment the ADC 149 (FIG. 4a) and the digital computer 153 (FIG. 4a) are described as separate from the focal plane chip 139 (FIG. 4a). With recent advances in electronics, it should be possible to implement an embedded ADC and microcontroller onto the focal plane chip 139 (FIG. 4a), thereby allowing a single-chip implementation of the above embodiment.

Dynamic Description

Figure 10B:
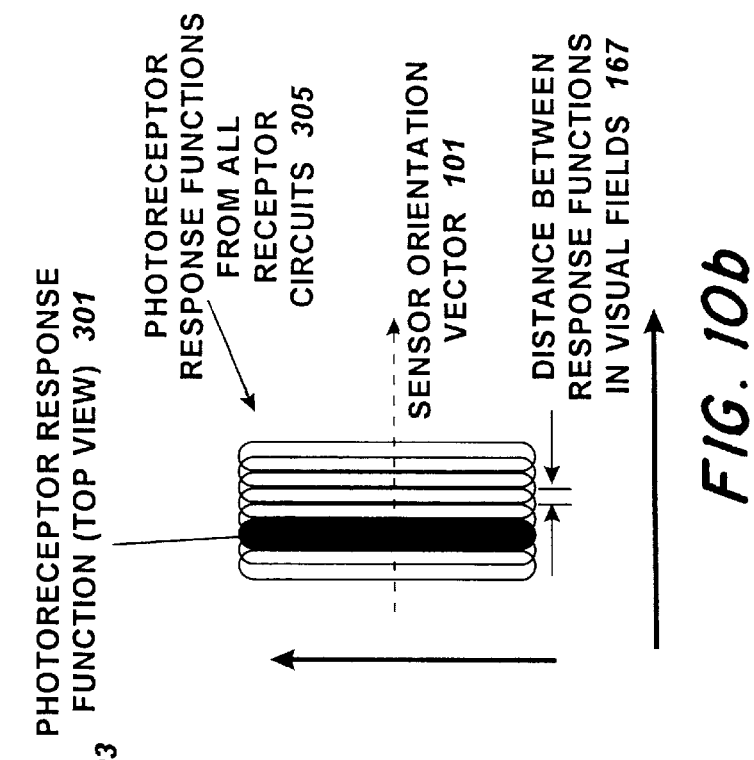
FIGS. 10a and 10b illustrate the photoreceptor response function of an individual photoreceptor circuit and how these response functions overlap in the photoreceptor circuit array.
Figure 10A:
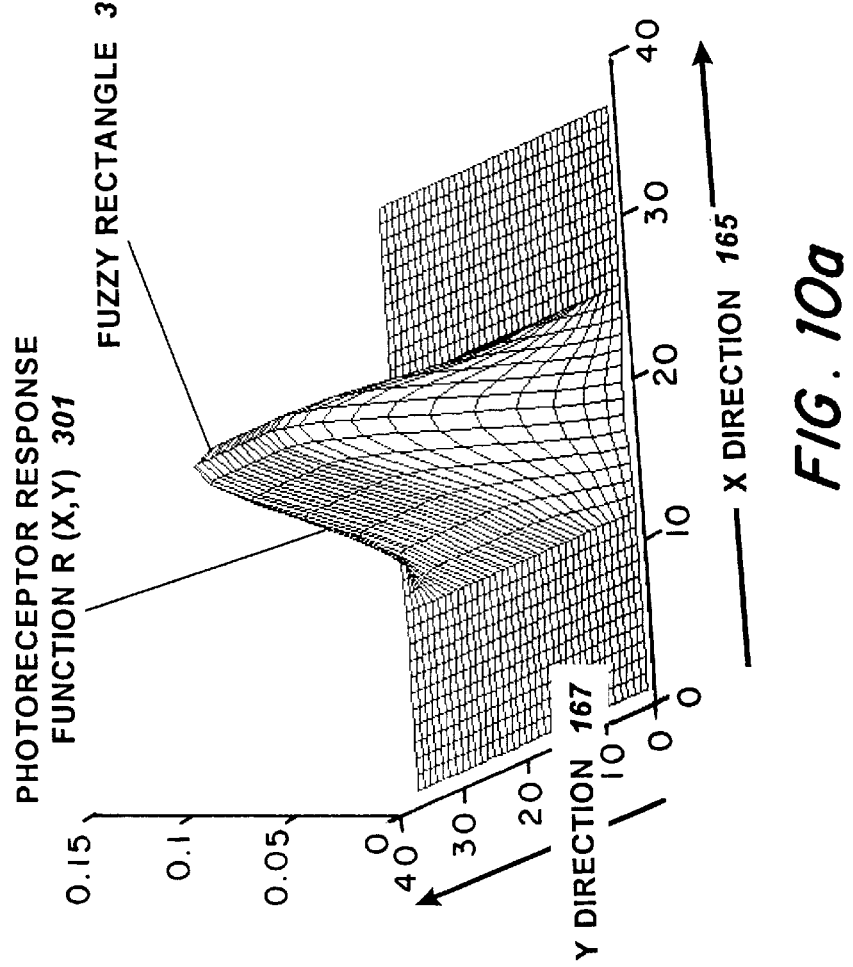

The lens 137 (FIG. 4a) being out of focus and the iris 143 (FIG. 4a) act together to cause a blurry image of the visual field 105 (FIG. 1) to form on the focal plane 139 (FIG. 4a). The extent of the blurring is clearly dependent on both the iris's transmission function 169 (FIG. 5) and the extent by which the focal plane 139 (FIG. 4a) is placed out of focus with respect to the lens 137 (FIG. 4a). The effect of this blurring is essentially equivalent to that of taking a perfectly focused image on the focal plane 139 (FIG. 4a) and convolving it with a smoothing function. The smoothing function's shape would be like that of the iris transmission function 169 (FIG. 5) scaled in size by a factor dependent on the extent which the focal plane 139 (FIG. 4a) is placed out of focus: The smoothing function is made smaller by focusing the image. Thus the iris transmission function 169 shown in FIG. 5 can be used to depict a smoothing function, except that the smoothing function is smaller in size. The converse effect is that the light striking a single point on the focal plane 139 (FIG. 4a) is a weighted sum of the light in that point's corresponding location in the visual field 105 (FIG. 1). The shape of the weighting function is that of the smoothing function projected back onto the visual field 105 (FIG. 1). Thus the light striking a rectangular phototransistor 175 (FIG. 7a) is also a weighted sum of the light in the visual field 105, with the weighting function in the shape of a blurry rectangle, which is the phototransistor rectangle convolved with the smoothing function. FIG. 10a shows this weighting function r(x,y) 301. This weighting function is hereafter referred to as the photoreceptor's response function. Thus, what we see from this discussion is that the response function of a photoreceptor implemented in the manner of this embodiment is not a long, skinny rectangle but the "fuzzy rectangle" 303 formed by smoothing the rectangle with the smoothing function. This process by which the image on the focal plane is blurred in a controlled fashion is referred to here as "optical smoothing".

Recall that the photoreceptor circuits 159 (FIG. 4a) are laid out so that the active areas 163 (FIG. 4b) form a linear array of rectangles. FIG. 10b shows a simplified top view of the photoreceptor response functions 305 of all photoreceptor circuits in the array, the sensor orientation vector 101 (FIG. 1), and the distanced between photoreceptors 167. Overlapping fuzzy rectangles are used to depict the photoreceptor response functions 301 of the photoreceptor circuits, to remind the reader that the photoreceptor response function 301 is computed by convolving the rectangle phototransistor shape 175 (FIG. 7a) with a smoothing function. As a result of optical smoothing, overlapping of the phototransistor response functions 305 occurs even though the individual phototransistors 175 (FIG. 7a) do not overlap. For clarity, the photoreceptor response function 301 of one photoreceptor circuit is darkened. Recall that the active areas 163 (FIG. 4b) of the phototransistors 175 (FIG. 6) are long and skinny rectangles that are parallel and non-overlapping. The amount of overlap of the photoreceptor response functions of adjacent photoreceptor circuits is controlled by the optical smoothing. The main benefit of this optical smoothing and having adjacent photoreceptor response functions 301 (FIG. 10a) overlap is that higher spatial frequency components of the visual field's 105 (FIG. 1) image are reduced. This helps to prevent spatial aliasing of higher spatial frequency components of the image on the focal plane 139 (FIG. 4a). This technique is analogous to that of low-pass filtering an analog signal before digitizing it for digital signal processing to eliminate spectral components above the Nyquist frequency. If this optical smoothing were not performed, then textures with high frequency components in the visual field 105 (FIG. 1) might cause the optic flows algorithm 155 (FIG. 4a) to make erroneous speed and direction measurements.

It is the photoreceptor signals 147 (FIG. 4a) that form the one dimensional image which is used by the optic flow algorithm 155 (FIG. 4a) to compute optic flow. The algorithms 200 and 250 in FIGS. 8 and 9 implement respectively a gradient method and a correlation method of computing optic flow. However before any steps can be performed on the digitized photoreceptor signals 151 (FIG. 4a), these signals need to be filtered to remove noise and mismatch error. This filtering is performed in step 205 of FIG. 8 and step 255 of FIG. 9. These steps minimize the effects of mismatch by performing high-pass filtering on the digitized photoreceptor signals 151 (FIG. 4a). These steps also perform low-pass filtering to remove noise that results from electromagnetic interference on the wires carrying the photoreceptor signals 147 (FIG. 4a).

Steps 205 (FIG. 8) and 255 (FIG. 9) are now discussed in more detail. Those familiar with the field of digital signal processing will recognize the computations of these steps as implementing a one-pole high-pass filter connected in series with a one-pole low-pass filter. The high-pass filter's cutoff frequency in radians-per-time-step is set by the parameter a, while the low-pass filter's cutoff frequency in radians-per-time-step is set by the parameter b, where one time step is approximately of duration dt. The purpose of the low-pass filter is to filter out noise that may occur as a result of electrical interference on the photoreceptor signal lines 147 (FIGS. 4a and 4b). The low-pass filter's cutoff should be set so that it is higher than the highest frequencies that would appear in the photoreceptor signals 147 as a result of moving texture 107 (FIG. 1) in the visual field 105 (FIG. 1). Thus, if the highest occurring frequency is $f_h$ Hz, then parameter b should be set so that $b > f_h * dt * 2\pi$.

The high-pass filter's cutoff frequency in radians-per-time-step is directed by parameter a. The purpose of the high-pass filter is to perform offset cancellation. Recall from above that in order for the sensor to function properly, the photoreceptor response functions 301 (FIG. 10a) must all be identical. Therefore, the photoreceptor circuits 159 (FIG. 4b) need to be identical. Unfortunately as a result of variations that occur in integrated circuit fabrication processes, these circuits will be slightly different. Fortunately these mismatches can be modeled as small varying offset voltages that are added in series to the photoreceptor circuit outputs 181 (FIG. 6). The effect of this offset voltage is that each photoreceptor signal 147 (FIG. 4a) is shifted up or down by a different but constant amount. By high-passing the digitized photoreceptor signals 151 (FIG. 4a), the constant voltage term is filtered out, thus canceling these offset terms.

The cutoff frequency of the high-pass filter should be set lower than the lowest frequencies that would appear in these signals.

Next is discussed the response of the photoreceptor circuits 159 (FIG. 4a) as the angle of incidence 111 (FIG. 1) between the optic flow vector 103 (FIG. 1) and the sensor orientation vector 101 (FIG. 1) varies. Here is considered why speed measured by the sensor is the magnitude of the projection vector 113 when the photoreceptor response functions 301 (FIG. 10a) are rectangular shaped and placed as described above. To do this, consider what any one-dimensional optic flow algorithm would detect when using such a photoreceptor array 159.

Figure 11:
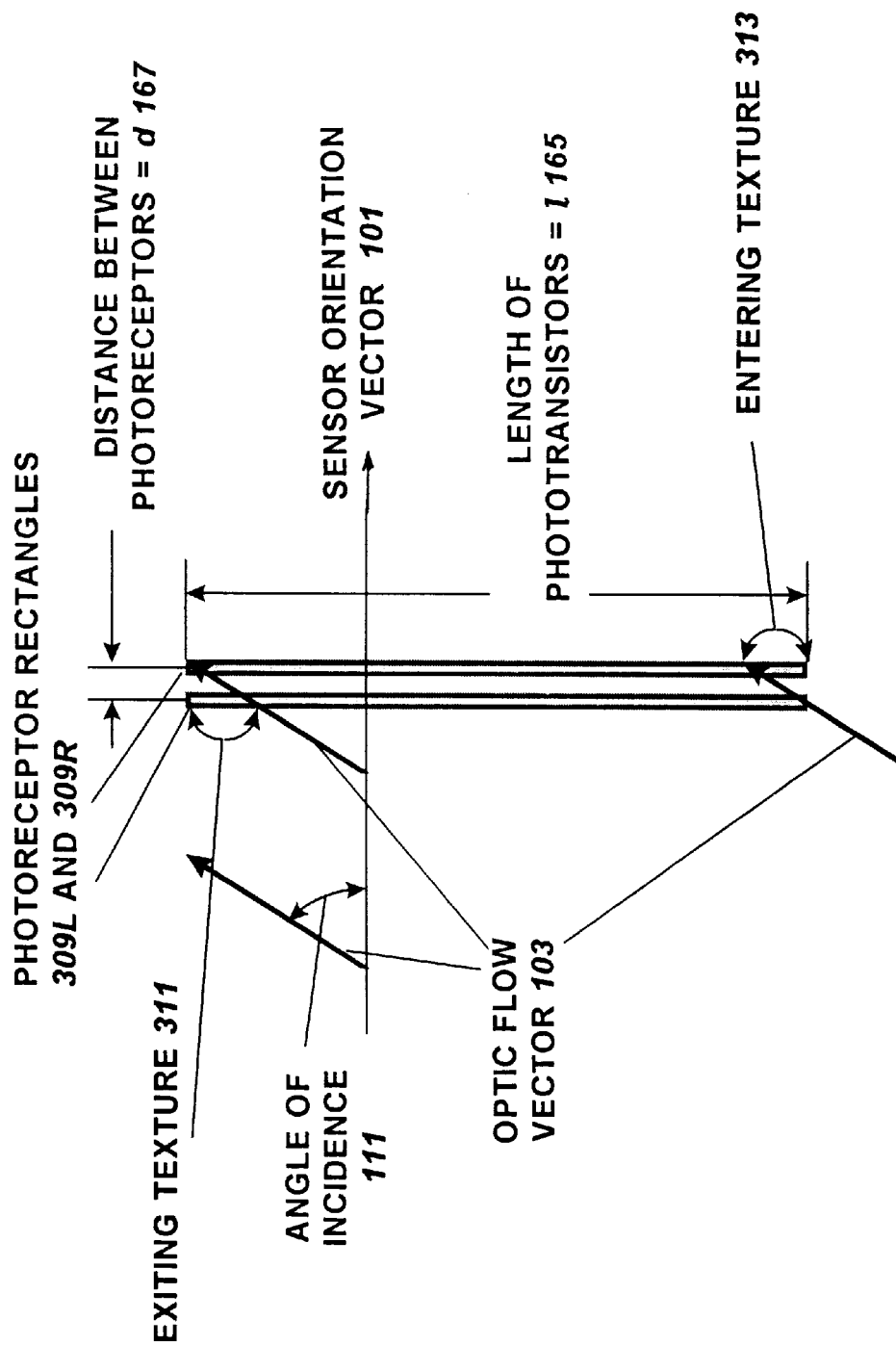
FIG. 11 shows how the linear photoreceptor array allows the projection of the 2-D optic flow vector onto the sensor orientation to be computed.

FIG. 11 shows a top view of the active areas of two adjacent phototransistors 309L and 309R from the photoreceptor circuit array 159 (FIG. 4a). Also shown is the sensor orientation vector 101, the optic flow vector 103, the distance d 167 between phototransistors, the phototransistor length l 165, where exiting texture 311 crosses the left photoreceptor, and entering texture 313 crosses the right photoreceptor. The exiting texture 311 is defined as the texture that crosses the left phototransistor 309L but does not cross the right phototransistor 309R. The exiting texture 311 "exits" the photoreceptor circuit array after it has crossed the first phototransistor. Likewise the entering texture is defined as the texture that crosses the right phototransistor 309R but does not cross the left phototransistor 309L. The entering texture "enters" the photoreceptor circuit array without crossing the first phototransistor. For the subsequent discussion, let θ represent the angle of incidence 111. Let v be the magnitude of the optic flow vector 103.

Assume that the angle of incidence 111 θ is 0 degrees, so that the texture motion is parallel to the array orientation 101 (FIG. 1). In this case, the outputs of photoreceptors 309L and 309R will be merely time delayed versions of each other with the time delay equal to $$\Delta t = d/v.$$

This same result applies to all photoreceptors in the array 159 (FIG. 4b). This set of signals will appear as pure one-dimensional motion and hence is easy for optic flow computation, as described in the background art section.

Now suppose θ 111 has a non-zero value. In this case the distance traveled by the texture when moving between the photoreceptors 309L and 309R is $d/\cos\theta$. Thus by simple division the time required to move from one photoreceptor to the next is $$\Delta t = d/v\cos\theta.$$

Thus the outputs of photoreceptors 309L and 309R are approximately delayed versions of each other, but with a longer delay caused by the fact the texture is moving at an angle. Using simple geometry, it can be seen that the speed seen by an optic flow algorithm is $$\hat{v} = v \cos\theta.$$

This is the magnitude of the projection of the optic flow vector onto the array orientation.

Note, however, that exiting texture 311 appears at photoreceptor 309L but not at photoreceptor 309R. Note also that entering texture 313 appears at photoreceptor 309R but not at photoreceptor 309L. Because of these exiting 311 and entering 313 textures, the sum of the texture arriving at photoreceptors 309L and 309R will be slightly different. The net result is that the outputs of adjacent photoreceptors are not exactly delayed versions of each other. Typically the exiting texture 311 and entering texture 313 are uncorrelated, therefore they appear as additive noise to the photoreceptor signals 147 (FIG. 4a). The phototransistor length exposed to exiting or entering texture is d tan θ. Because both exiting 311 and entering 313 textures contribute to the above additive noise, the power of this additive noise is on the order of 2d tan θ. If the relationship $$2d \tan \theta \ll l$$

holds, then the strength of the additive noise is much less than the strength of the signal, due to the phototransistor 175 (FIG. 6) of length l 165 (FIG. 4b). Thus if θ is not near 90 degrees and if the elongated phototransistors 175 (FIG. 6) are sufficiently long, then the magnitude of this noise is small compared to the photoreceptor signal 147 (FIG. 4a). Therefore an optic floss algorithm 155 (FIG. 4a) using the photoreceptor array 163 (FIG. 4b) will compute an accurate measurement of the projection vector 113 (FIG. 1). The accuracy of this measurement can be increased for high angles of incidence 111 (FIG. 1) by increasing the ratio of the photoreceptor length l 165 (FIG. 4b) to the photoreceptor separation distance d 167 (FIG. 4b). The required ratio of l to d depends on the desired robustness to higher values of θ. In practice, it is suggested that the ratio l/d be greater than 10.

3. The Second Preferred Embodiment

The second preferred embodiment is created from the first by 1) changing the iris 143 (FIG. 4a) so that it's transmission function 169 (FIG. 5) has a fuzzy rectangle shape 303 (FIG. 10a), 2) changing the shape of each phototransistor 175 (FIG. 7a) so that each active area 163 (FIG. 4b) is a small compact point-like shape, and 3) optionally removing the lens 137 (FIG. 4a). The remainder of the photoreceptor circuits 161 are essentially the same, except that the diode-connected MOSFETs 179 (FIG. 6) may need to be made narrower to accommodate reduced current levels associated with smaller phototransistors 175 (FIG. 6). The other parts of the sensor are also the same as in the first preferred embodiment.

Figures 12A, 12B:
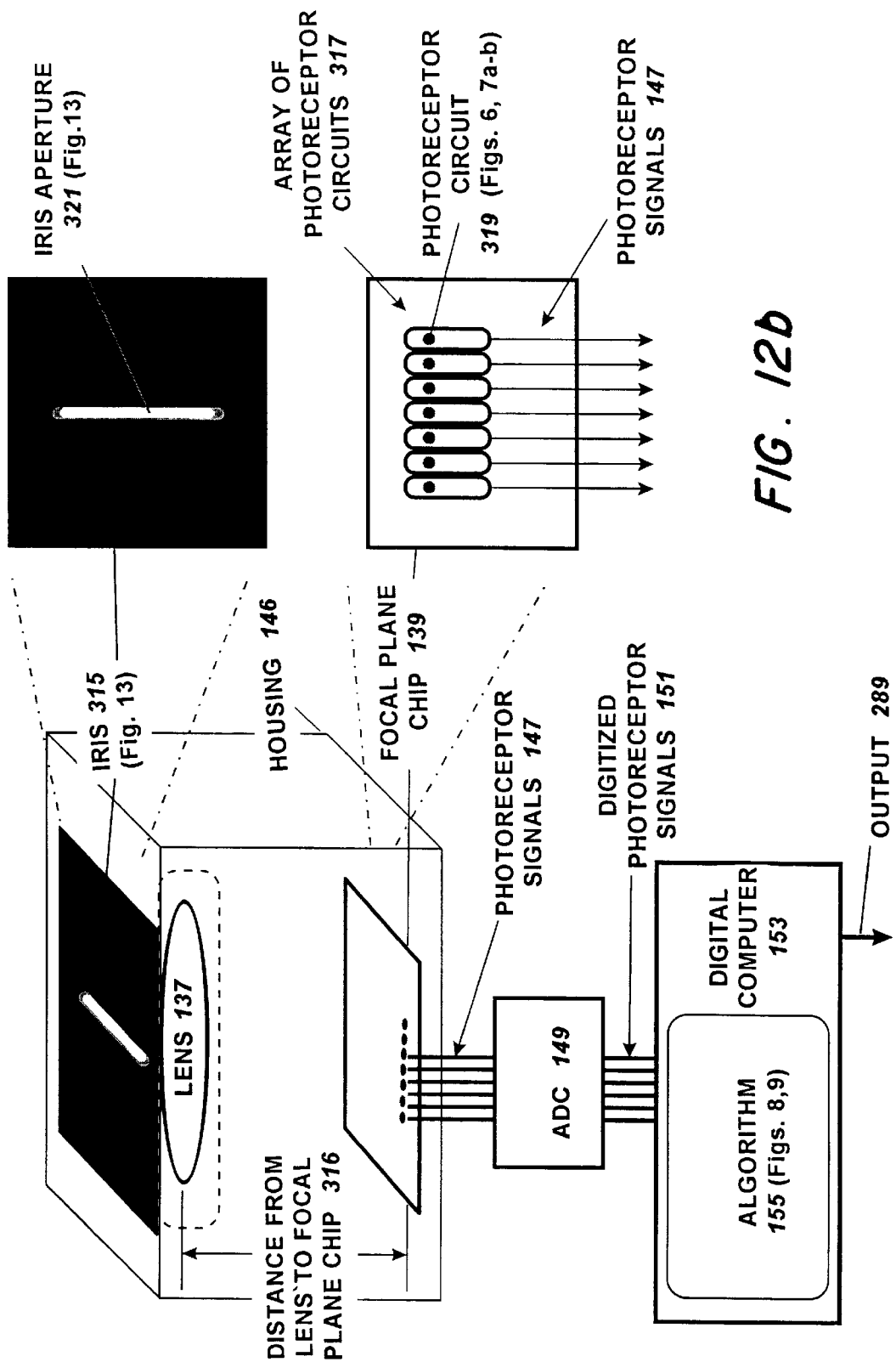
FIGS. 12a and 12b show the structural elements of a second preferred embodiment.

FIGS. 12a and 12b show the second preferred embodiment in detail: The iris 315 is reshaped to have an aperture 321 shaped like a long rectangle. The lens 137 can be included as in the first preferred embodiment, on either side of the iris 315, or it can be left out. The focal plane chip 139 is mounted a predetermined distance 316 from the lens 137, if included, or from the iris 315. Coming off the focal plane chip 139 are the same P photoreceptor signals 147 which get digitized by the ADC 149. The digitized photoreceptor signals 151 are processed by an algorithm 155 on a digital computer 153, just as in the first preferred embodiment. The focal plane chip contains an array of P photoreceptor circuits 317. Each photoreceptor circuit 317 has an active area 319 that is compact and point-like.

Due to the ray nature of light, each photoreceptor circuit 161 will have a fuzzy-rectangular 303 (FIG. 10a) shaped response in the visual field 105 (FIG. 1). This happens whether or not the out-of-focus lens 137 is included, though the response function's size 301 (FIG. 10a) can be varied be the lens 137 placement. To implement optical smoothing, the iris 315 may have a graded transmission function whose shape is like the photoreceptor response function 301 in FIG. 10a. However the transmission function need not be graded—it can take the form of a simple rectangle. Optical smoothing may also be performed by enlarging the photoreceptor circuit active area 319 to a larger circle or square. In this case the response function will be a convolution function of the iris transmission function and the phototransistor geometry. The photoreceptor response functions 301 (FIG. 10a) can then be made to overlap and remove higher spatial frequencies just as in the first preferred embodiment and shown in FIG. 10b.

Figure 13:
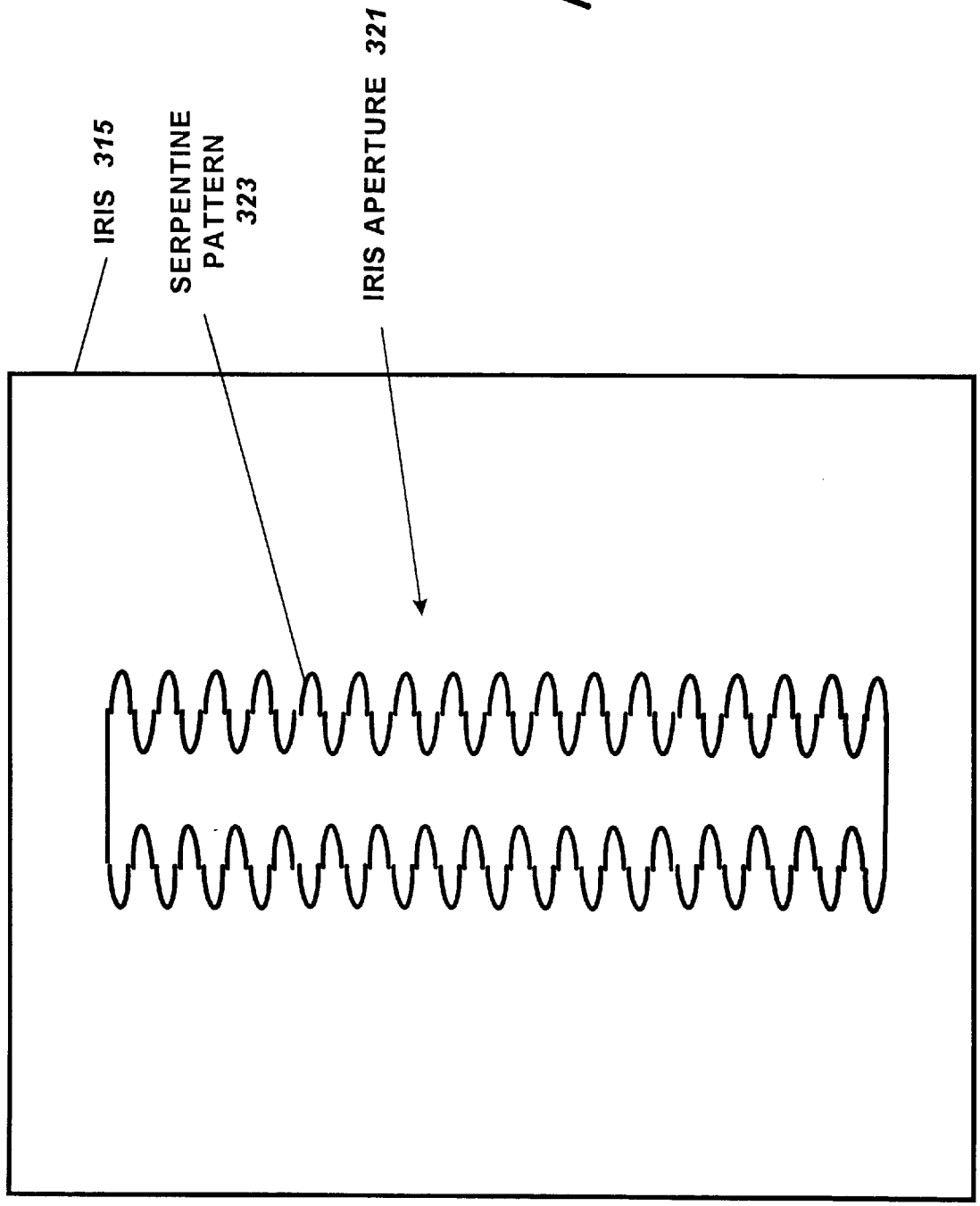
FIG. 13 shows an alternate way of forming an iris with a fuzzy rectangular transmission function.

FIG. 13 shows an alternate means of constructing the iris 315 to mimic the effects of a graded transmission function. Shown are the iris 315, the aperture 321, and a serpentine pattern 323 that forms the edge of the aperture. In this case, the size of the serpentine patterns 323 should be smaller than the photoreceptor circuit active area 319 (FIG. 12b). Because the shape of the photoreceptor's response function is the iris aperture 321 convolved with the phototransistor active area 319, the serpentine pattern 323 fringes will merge to be equivalent to an iris with a graded transmission.

The advantages of this embodiment are that smaller photoreceptor circuits can be used and the lens is optional. These factors allow more compact and light versions of the optics to be created. Such a sensor could be fabricated using micro-electromechanical system (MEMS) techniques. The main disadvantage is that less light will strike the phototransistors, which could limit the sensor's performance in low light conditions.

4. Variations

Above we described two preferred embodiments of the present invention. Here one shall discuss variations of the above embodiments. This discussion is to illustrate the number of different ways this sensor can be implemented. All the following variations are deemed within the scope of this invention.

Variation 1:

The first variation is to the first preferred embodiment, shown in FIG. 4a and 4b. In this variation the lens 137 is removed. This variation is analogous of a pinhole camera, with the iris 143 forming the pinhole. In this case, the shape of a photoreceptor's response function 301 (FIG. 10a) would be a function of it's active area 163 and the iris's transmission function 169 (FIG. 5). Thus the iris 143 would have to be very small to form a good image on the focal plane chip 139. The advantage of this variation is that no lens would be required, thus reducing the weight of this sensor. The disadvantage of this variation is that the amount of light hitting a photoreceptor would be small, thus the sensor might not work in low light conditions.

Variation 2:

In both of the above embodiments, the photoreceptor signals 147 were first digitized then sent to a digital computer 153 for final optic flow processing. A variation on the above scheme is to implement the optic flow algorithm 155 in analog circuitry rather than in a digital computer. In this case the photoreceptor signals 147 would not need to be digitized. Care must be taken to ensure that the photoreceptor circuits 161 (FIG. 6) are identical, otherwise an analog high-pass filter would need to be inserted before the circuitry implementing the optic flow algorithm to remove offset.

Variation 3:

A third variation is also to the first embodiment. Rather than use an iris 143 with a continuously varying transmission function, the iris can be made to have a serpentine pattern as in the second preferred embodiment. This can be done with or without the lens 137 (FIG. 4a). The lens 137 (FIG. 4a) being out of focus will cause the fringes of the iris to merge in the same way discussed above.

Variation 4:

A fourth variation is also to the first embodiment. Rather than using rectangular shaped phototransistors, a number of point-like (or other shape) phototransistors can be laid out in a regular pattern. Then a subset of these phototransistors that are arranged in a row or cover a rectangular area can be electrically connected together to virtually form an approximate phototransistor rectangle. FIG. 14a depicts an array 325 of point phototransistors arranged in a hexagonal array and different virtual phototransistor rectangles 327 that can be formed. With the topology shown, virtual phototransistor rectangles 327 can be formed in three different directions 60 degrees apart. FIG. 14b shows two point phototransistors, 329 and 331, and a connecting MOSFET 333. FIG. 14b shows how point phototransistors can be electrically connected. The gate of the MOSFET 333 is set high to electrically connect the two phototransistors. This basic structure is repeated and used to electrically connect all phototransistors 325 participating in a virtual phototransistor rectangle 327. Due to the optical smoothing performed by the iris 143 and the lens 137 being out of focus, the response function 301 will be almost the same as if a single rectangular phototransistor were laid out. Other topologies are clearly possible as well. The advantage of this variation is that virtual phototransistor rectangles 327 can be laid out that overlap each other in the focal plane.

Variation 5:

A fifth variation is also to the first preferred embodiment. So far we have just discussed linear arrays of phototransistors all oriented in the same direction, e.g. 159 in FIG. 4b. The phototransistors can be arranged in a manner that forms a one dimensional array, but the array need not be linear as shown in FIG. 4b, which is best used for translational optic flow. FIG. 15a shows a concentric ring layout of the phototransistors that can be useful for measuring optic flow patterns that are generated by approaching an object in the environment. It is said that these phototransistors are arranged in an expanding array. Such optic flow has a divergent quality. The individual phototransistor active area rings 335 are either arcs, as shown, or complete circles, not shown, but all with a common center 337. The radii 339 of successive phototransistor active areas can increase in a linear fashion, a polynomial fashion, an exponential fashion, or in another fashion. The advantage of this photoreceptor layout is that an optic flow algorithm performed on the photoreceptor signals will directly compute the divergence of the optic flow field.

Figure 15B:
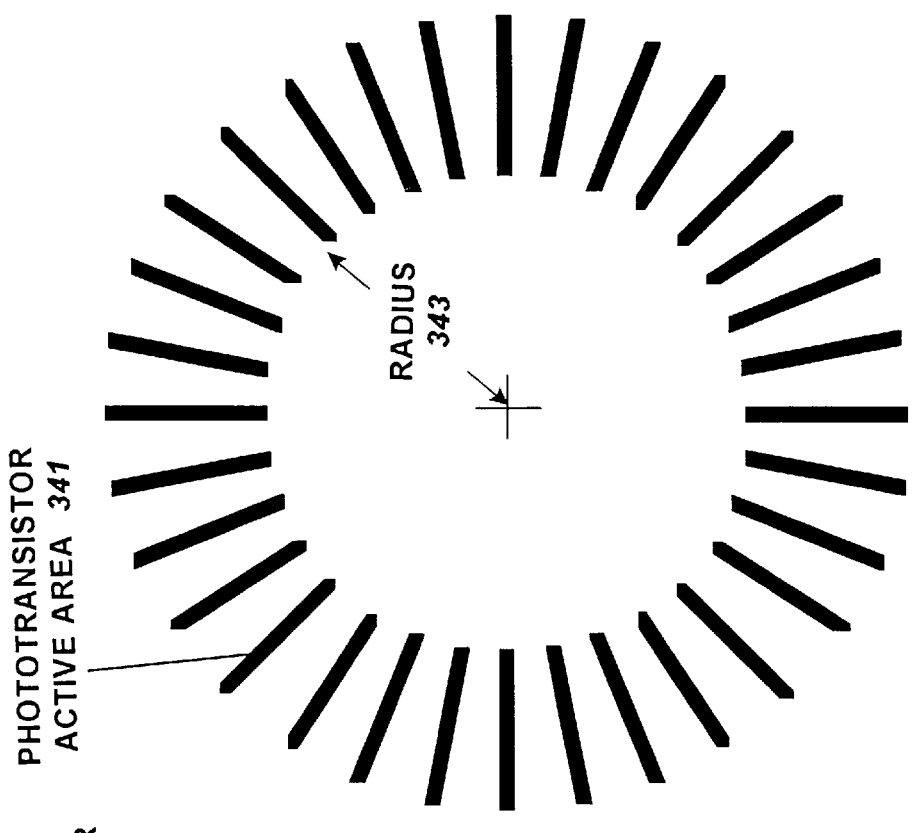
Figure 15A:
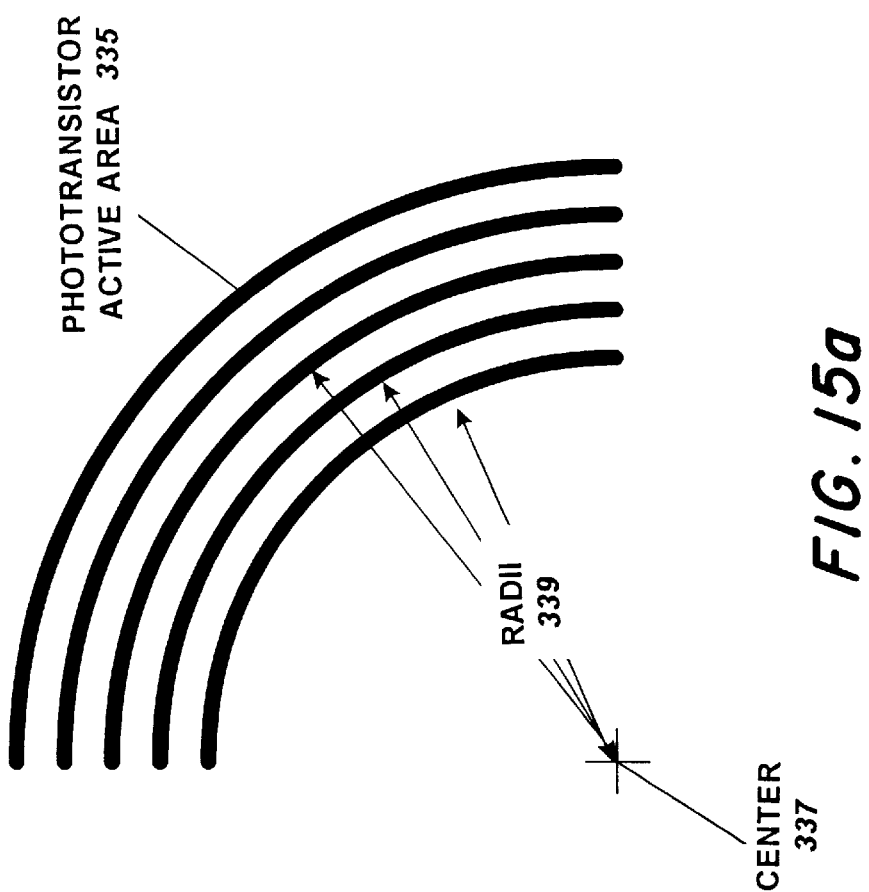

FIG. 15b shows a ring of rectangular phototransistor active areas that can be useful for measuring optic flow that is generated by rotation. It is said that these phototransistors are arranged in a circular array. Such optic flow has a curl quality. The individual phototransistor active areas 341 are of the same length but arranged to form a closed loop of a predetermined radius 343. The output of an optic flow algorithm on these photoreceptor signals will directly compute the curl of the optic flow.

Other more exotic phototransistor shapes and arrangements can be created as well that map some exotic shape in space onto a linear array. These shapes can be made to match particular objects that may be of interest in the environment. FIG. 15c shows how such special photoreceptor shapes can be laid out. Shown are concentric arbitrary phototransistor active area shapes 345 and a common center 347. Essentially enlarged and shrunk versions of the same shape are laid out on the focal plane chip so that they have a common center.

Figure 16:
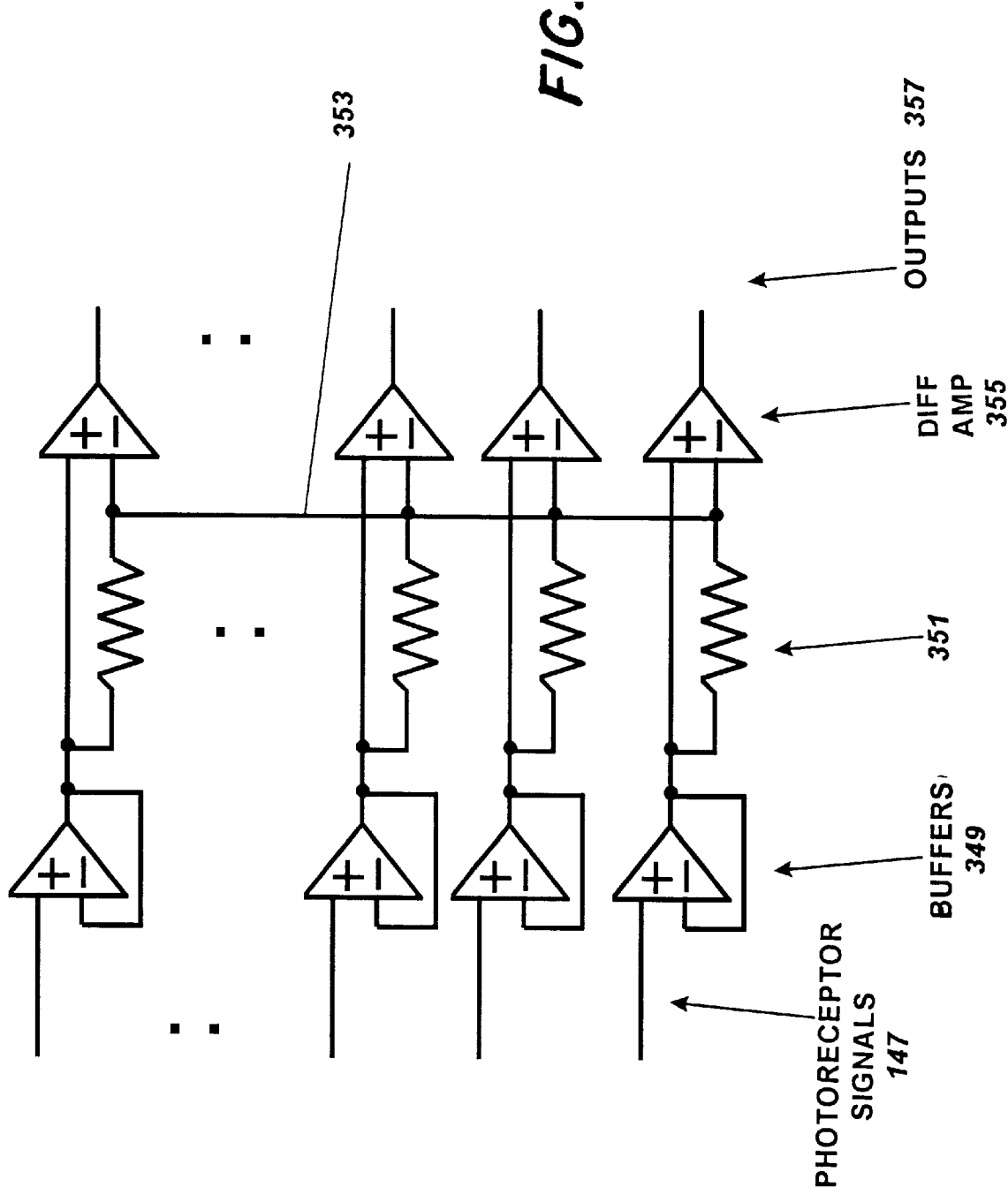
FIG. 16 shows an artificial retina-type circuit that can be used to improve the sensor performance.

Variation 6:

A sixth variation is an improvement that can be inserted to both preferred embodiments, in between the photoreceptor signals 147 (FIG. 4b) and the ADC 149 (FIG. 4b). Refer to FIG. 16: The photoreceptor signals 147 provide input to an array of buffer-connected operational amplifiers 349. An array of resistors 351 connects the buffer-connected operational amplifiers to a common node 353. The voltage at node 353 represents the mean of the input photoreceptor signals 147. A second array of differential amplifiers 355 outputs an amplified version of the difference between the buffered photoreceptor signals and their mean. The gain of the differential amplifiers 355 in the second array is on the order of tens to a hundred. One advantage of this circuit is that the circuit in FIG. 16 as a whole adapts to general intensity variations in the environment, and this general change is not reflected in the outputs 357. A second advantage is the signals output by this circuit can then be sent off the chip with a much stronger signal than without this circuit. This gives the system added immunity against electromagnetic noise in the environment. The circuit in FIG. 16 belongs to a general class of "silicon retina" circuits, all of which could be used for the same purpose. The book *Analog VLSI and Neural Systems* by Carver Mead contains general information on other silicon retinas.

5. Advantages

Figure 17:
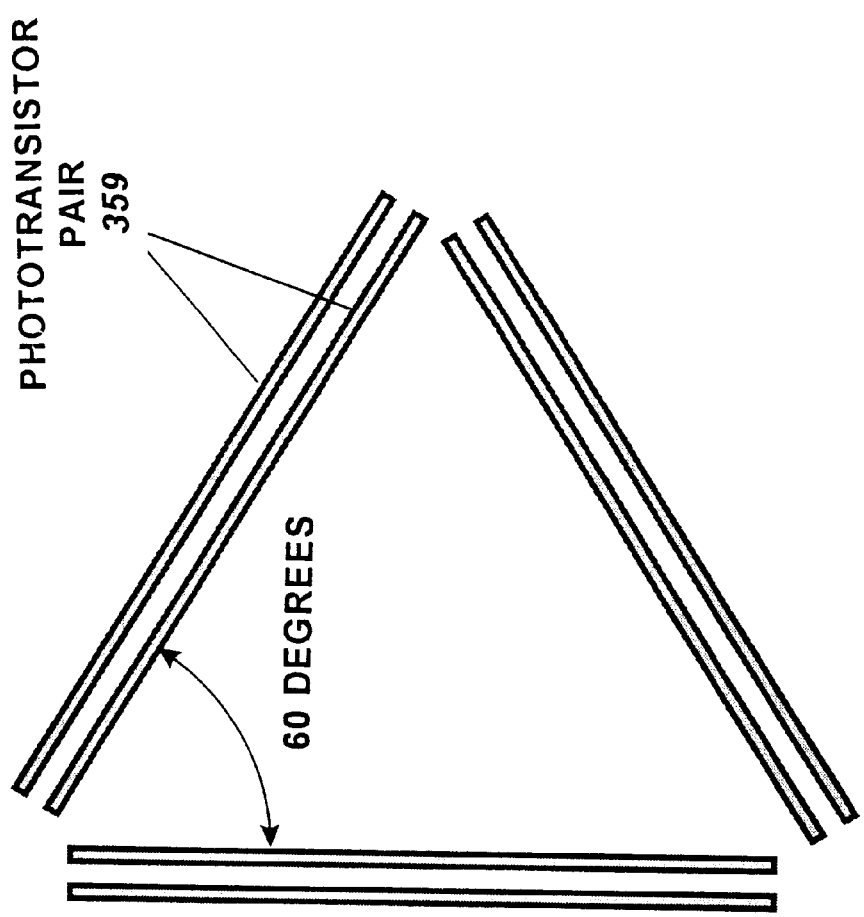
FIG. 17 shows a set of three photoreceptor arrays that allows two-dimensional optic flow measurement.

The advantages of this invention are:

1) It allows the projection 113 (FIG. 1) of the two-dimensional optic flow vector 103 (FIG. 1) onto the array orientation vector 101 (FIG. 1) to be measured. This allows the measurement of two-dimensional optic flow from several arrays oriented in different directions. FIG. 17 shows three different phototransistor pairs 359 oriented in three directions 60 degrees apart. Each of these phototransistor pairs 359 can be processed using the gradient algorithm outlined in FIG. 8. Then vector arithmetic can be used on the algorithm outputs to measure a two dimensional optic flow vector.

2) Optical flow can be measured with reduced complexity algorithms due to the reduced dimensionality of the input and due to the optical smoothing performed by the out-of-focus lens and the iris.

3) The required circuits to be implemented in VLSI are extremely simple, allowing rapid design for a specific application.

What is claimed and desired to be secured by Letters Patent of the United States is:

1. A linear optic flow sensor comprising:

a focal plane chip comprising a plurality of photoreceptor circuits;

said plurality of photoreceptor circuits responsive to a two-dimensional visual field for producing a plurality of photoreceptor signals, said photoreceptor circuits atranged in a linear array, each of said photoreceptor circuits having an elongated rectangular-shaped active area;

a lens for focusing light from said visual field onto said focal plane chip, wherein the distance from said lens to said focal plane chip is set in order to produce an image which is out of focus;

means responsive to said photoreceptor signals for measuring one-dimensional optic flow and providing an output comprised of at least one measurement from a group comprising of speed measurement, direction measurement, or both speed and direction measurements;

whereby a one-dimensional optic flow measurement is obtained from said output.

2. The linear optic flow sensor of claim 1 further comprising:

an iris having a transmission function selected such that light is transmitted with full efficiency at the center of said iris and with decreasing efficiency towards an edge of said iris.

3. The linear optic flow sensor of claim 1 further comprising:

means for digitizing said photoreceptor signals, and wherein said means for measuring one dimensional optic flow is implemented using digital circuitry, digital logic, and an algorithm on a digital computer.

4. The linear optic flow sensor of claim 1 further comprising:

means for digitizing said photoreceptor signals, and wherein said means for measuring one dimensional optic flow is implemented using digital circuitry, digital logic, and an algorithm on a digital computer.

5. A linear optic flow sensor comprising:

a focal plane chip comprising a plurality of photoreceptor circuits;

said plurality of photoreceptor circuits responsive to a two-dimensional visual field for producing a plurality of photoreceptor signals, said photoreceptor circuits arranged in a linear array;

a lens for focusing light from said visual field onto said focal plane chip, wherein the distance from said lens to said focal plane chip is set in order to produce an image which is out of focus;

an iris, having a transmission function selected such that light is transmitted with full efficiency at the center of said iris and with decreasing efficiency towards an edge of said iris; and means responsive to said photoreceptor signals for measuring one-dimensional optic flow and providing an output comprised of at least one measurement selected from a group comprising of speed measurement, direction measurement, or both speed and direction measurements;

whereby a one-dimensional optic flow measurement is obtained from said output.

6. The linear optic flow sensor of claim 5 further comprising:

means for digitizing said photoreceptor signals, and wherein said means for measuring one-dimensional optic flow is implemented using digital circuitry, digital logic, and an algorithm on a digital computer.

7. A linear optic flow sensor comprising:

a focal plane chip comprising a plurality of photoreceptor circuits;

a lens for focusing light from said visual field onto said focal plane chip, wherein the distance from said lens to said focal plane chip is set in order to produce an image which is out of focus;

said plurality of photoreceptor circuits responsive to a two-dimensional visual field for producing a plurality of photoreceptor signals, said photoreceptor circuits arranged in an expanding array and having concentrically shaped active areas; and means responsive to said photoreceptor signals for measuring one-dimensional optic flow and providing an output comprised of at least one measurement selected from a group comprising of speed measurement, direction measurement, or both speed and direction measurements;

whereby a one-dimensional optic flow measurement is obtained from said output.

8. The linear optic flow sensor of claim 7 further comprising:

an iris having a transmission function selected such that light is transmitted with full efficiency at the center of said iris and with decreasing efficiency towards an edoe of said iris.

9. A linear optic flow sensor comprising:

a focal plane chip comprising a plurality of photoreceptor circuits;

a lens for focusing light from said visual field onto said focal plane chip, wherein the distance from said lens to said focal plane chip is set in order to produce an image which is out of focus or blurred;

said plurality of photoreceptor circuits responsive to a two-dimensional visual field for producing a plurality of photoreceptor signals, said photoreceptor circuits arranged in a circular array and having rectangular shaped active areas said active areas radiating from said circular array's center; and means responsive to said photoreceptor signals for measuring one-dimensional optic flow and providing an output comprised of at least one measurement selected from a group comprising of speed measurement, direction measurement, or both speed and direction measurements;

whereby a one-dimensional optic flow measurement is obtained from said output.

10. The linear optic flow sensor of claim 9 further comprising:

an iris having a transmission function selected such that light is transmitted with full efficiency at the center of said iris and with decreasing efficiency towards an edge of said iris.

11. A linear optic flow sensor comprising:

a focal plane chip comprising a plurality of photoreceptor circuits;

a lens for focusing light from said visual field onto said focal plane chip, wherein the distance from said lens to said focal plane chip is set in order to produce an image which is out of focus or blurred;

an iris for controlling blurring of said image by controllably varying the transmission function of said iris;

said plurality of photoreceptor circuits responsive to a visual field for producing a plurality of photoreceptor signals, said photoreceptor circuits arranged in a linear array, each of said photoreceptor circuits having an elongated rectangular-shaped active area;

means responsive to said photoreceptor signals for measuring one-dimensional optic flow and providing an output comprised of at least one measurement selected from a group comprising of speed measurement, direction measurement, or both speed and direction measurements;

whereby a one-dimensional optic flow measurement is obtained from said output.

12. A linear optic flow sensor of claim 11, wherein said iris is smaller than the size of said lens.

13. A linear optic flow sensor of claim 11, wherein said optic flow sensor is one-dimensional and said visual field operates in two-dimensions.

14. A linear optic flow sensor of claim 13, wherein said linear photoreceptor array has an orientation in a two-dimensional image space, and information in said two-dimensional image space parallel to said photoreceptor array's orientation is preserved while information in other directions is discarded.

15. The linear optic flow sensor of claim 14 further comprising:

means for digitizing said photoreceptor signals, and wherein said means for measuring one-dimensional optic flow is implemented using digital circuitry, digital logic, and an algorithm on a digital computer.

* * * * *